US009522595B2

(12) United States Patent
Rudakevych et al.

(10) Patent No.: US 9,522,595 B2
(45) Date of Patent: Dec. 20, 2016

(54) SMALL UNMANNED GROUND VEHICLE

(75) Inventors: Pavlo E. Rudakevych, Arroyo Grande, CA (US); Garran M. Gossage, San Luis Obispo, CA (US); Christopher Lyunne Morey, San Luis Obispo, CA (US); Todd M. Meaney, San Luis Obispo, CA (US); Timothy R. Ohm, Grover Beach, CA (US); Adam Wozniak, Los Osos, CA (US)

(73) Assignee: iRobot Defense Holdings, Inc., Bedford, MA (US)

( * ) Notice: Subject to any disclaimer, the term of this patent is extended or adjusted under 35 U.S.C. 154(b) by 94 days.

(21) Appl. No.: 13/342,022

(22) Filed: Dec. 31, 2011

(65) Prior Publication Data

US 2014/0110183 A1    Apr. 24, 2014

Related U.S. Application Data

(60) Provisional application No. 61/442,790, filed on May 19, 2012, provisional application No. 61/436,994, filed on Jan. 27, 2011.

(51) Int. Cl.
*B62D 55/00*    (2006.01)
*B60K 1/00*    (2006.01)
(Continued)

(52) U.S. Cl.
CPC .......... *B60K 17/043* (2013.01); *B60K 7/0007* (2013.01); *B60L 1/003* (2013.01); *B60L 11/1805* (2013.01);
(Continued)

(58) Field of Classification Search
CPC ..... B60K 17/043; B60K 7/0007; B60L 1/003; B60L 11/1805
(Continued)

(56) References Cited

U.S. PATENT DOCUMENTS 1,358,575 A    11/1920 Rimailho
1,509,030 A    9/1924 Roy
(Continued)

FOREIGN PATENT DOCUMENTS

CN    101492072 A    7/2009
KR    100861325    10/2008
(Continued)

OTHER PUBLICATIONS

International Search Report and Written Opinion for Application No. PCT/US2012/023043 dated Jul. 4, 2013.
(Continued)

*Primary Examiner* — Jacob Knutson
(74) *Attorney, Agent, or Firm* — Jenkins, Wilson, Taylor & Hunt, P.A.

(57) ABSTRACT

The present teachings relate generally to a small remote vehicle having rotatable flippers and a weight of less than about 10 pounds and that can climb a conventional-sized stairs. The present teachings also relate to a small remote vehicle can be thrown or dropped fifteen feet onto a hard/inelastic surface without incurring structural damage that may impede its mission. The present teachings further relate to a small remote vehicle having a weight of less than about 10 pounds and a power source supporting missions of at least 6 hours.

24 Claims, 32 Drawing Sheets

(51) Int. Cl.
| | |
|---|---|
| *B60R 16/04* | (2006.01) |
| *B60K 17/04* | (2006.01) |
| *B60K 7/00* | (2006.01) |
| *F41H 7/00* | (2006.01) |
| *B60L 1/00* | (2006.01) |
| *B60L 11/18* | (2006.01) |
| *B62D 55/06* | (2006.01) |

(52) U.S. Cl.
CPC ........ *B60L 11/1816* (2013.01); *B60L 11/1861* (2013.01); *B60L 11/1864* (2013.01); *B60L 11/1874* (2013.01); *B60L 11/1877* (2013.01); *B62D 55/06* (2013.01); *F41H 7/005* (2013.01); *B60K 2007/0046* (2013.01); *B60K 2007/0061* (2013.01); *B60L 2200/40* (2013.01); *B60L 2220/42* (2013.01); *B60L 2240/12* (2013.01); *B60L 2240/14* (2013.01); *B60L 2240/425* (2013.01); *B60L 2240/545* (2013.01); *B60L 2240/547* (2013.01); *B60L 2240/549* (2013.01); *B60L 2240/662* (2013.01); *B60L 2250/10* (2013.01); *B60L 2250/16* (2013.01); *B60L 2260/28* (2013.01); *B60L 2260/32* (2013.01); *B60Y 2200/25* (2013.01); *Y02T 10/648* (2013.01); *Y02T 10/7005* (2013.01); *Y02T 10/7044* (2013.01); *Y02T 10/7061* (2013.01); *Y02T 10/7072* (2013.01); *Y02T 10/7291* (2013.01); *Y02T 90/14* (2013.01); *Y02T 90/16* (2013.01)

(58) Field of Classification Search
USPC .................. 180/9.32, 8.2, 8.7, 9.1, 8.5, 907
See application file for complete search history.

(56) References Cited

U.S. PATENT DOCUMENTS

| | | | |
|---|---|---|---|
| 1,592,654 A | 7/1926 | Bremer | |
| 3,166,138 A | 1/1965 | Dunn | |
| 3,417,832 A | 12/1968 | Ziccardi | |
| 3,489,236 A | 1/1970 | Goodwin | |
| 4,483,407 A | 11/1984 | Iwamoto et al. | |
| 4,702,331 A | 10/1987 | Hagihara et al. | |
| 4,722,625 A * | 2/1988 | O'Brien | B05B 12/00 200/520 |
| 4,727,949 A | 3/1988 | Rea et al. | |
| 4,932,831 A | 6/1990 | White et al. | |
| 5,022,812 A | 6/1991 | Coughlan et al. | |
| 5,040,626 A | 8/1991 | Paynter | |
| 5,413,454 A | 5/1995 | Movsesian | |
| 5,435,405 A | 7/1995 | Schempf et al. | |
| 5,451,135 A | 9/1995 | Schempf et al. | |
| 5,513,716 A | 5/1996 | Kumar et al. | |
| 6,113,343 A | 9/2000 | Goldenberg et al. | |
| 6,263,989 B1 | 7/2001 | Won | |
| 6,361,570 B1 | 3/2002 | Gow | |
| 6,428,266 B1 | 8/2002 | Solomon et al. | |
| 6,431,296 B1 | 8/2002 | Won | |
| 6,523,629 B1 | 2/2003 | Buttz et al. | |
| 6,668,951 B2 | 12/2003 | Won | |
| 6,837,318 B1 | 1/2005 | Craig et al. | |
| 7,266,421 B1 | 9/2007 | Blayrac et al. | |
| 7,348,747 B1 | 3/2008 | Theobold et al. | |
| 7,468,592 B2 | 12/2008 | Lim et al. | |
| 7,475,745 B1 | 1/2009 | DeRoos | |
| 7,546,891 B2 | 6/2009 | Won | |
| 7,581,605 B2 | 9/2009 | Caspi et al. | |
| 7,645,110 B2 | 1/2010 | Ogawa et al. | |
| 7,654,348 B2 | 2/2010 | Ohm et al. | |
| 7,793,743 B2 | 9/2010 | Kamimura | |
| 8,002,365 B2 | 8/2011 | Jacobsen et al. | |
| 8,360,178 B2 | 1/2013 | Goldenberg et al. | |
| 8,918,214 B2 | 12/2014 | Bosscher et al. | |
| 9,346,499 B2 | 5/2016 | Rudakevych et al. | |
| 2001/0047895 A1 | 12/2001 | De Fazio et al. | |
| 2002/0007230 A1 | 1/2002 | Ueno et al. | |
| 2002/0062999 A1 | 5/2002 | De-Noor et al. | |
| 2002/0118098 A1 | 8/2002 | Apneseth | |
| 2003/0183428 A1 | 10/2003 | Hedeen | |
| 2005/0023052 A1 | 2/2005 | Beck et al. | |
| 2005/0071048 A1 | 3/2005 | Watanabe et al. | |
| 2007/0120701 A1* | 5/2007 | Teller | 340/693.9 |
| 2007/0193790 A1 | 8/2007 | Goldenberg et al. | |
| 2008/0093131 A1 | 4/2008 | Couture et al. | |
| 2008/0143065 A1 | 6/2008 | De Fazio et al. | |
| 2008/0179115 A1 | 7/2008 | Ohm et al. | |
| 2008/0183332 A1 | 7/2008 | Ohm et al. | |
| 2008/0184840 A1 | 8/2008 | Novoplanski et al. | |
| 2008/0223630 A1 | 9/2008 | Couture et al. | |
| 2008/0296853 A1 | 12/2008 | Langford et al. | |
| 2008/0316128 A1* | 12/2008 | Apostolos | 343/742 |
| 2008/0316306 A1 | 12/2008 | Burkle et al. | |
| 2009/0314554 A1 | 12/2009 | Couture et al. | |
| 2010/0116566 A1* | 5/2010 | Ohm et al. | 180/8.2 |
| 2010/0139995 A1* | 6/2010 | Rudakevych | 180/9.32 |
| 2011/0180334 A1 | 7/2011 | Rudakevych | |
| 2011/0240382 A1* | 10/2011 | Gettings et al. | 180/9.1 |
| 2011/0266076 A1 | 11/2011 | Morey et al. | |
| 2012/0097461 A1 | 4/2012 | Rudakevych | |
| 2012/0199407 A1 | 8/2012 | Morey et al. | |
| 2012/0261200 A1 | 10/2012 | Ohm et al. | |
| 2013/0256042 A1 | 10/2013 | Rudakevych | |
| 2014/0069731 A1 | 3/2014 | Ohm et al. | |
| 2014/0142753 A1 | 5/2014 | Ohm et al. | |
| 2014/0231156 A1 | 8/2014 | Rudakevych | |
| 2014/0305718 A1 | 10/2014 | Ohm et al. | |

FOREIGN PATENT DOCUMENTS

| | | |
|---|---|---|
| WO | WO-2008097376 A2 | 8/2008 |
| WO | 2012170081 | 12/2012 |

OTHER PUBLICATIONS

European Search Report for Application No. EP 12152964 mailed Apr. 22, 2013.
European Search Report for Application No. 14179187.1, dated Nov. 7, 2014.
International Preliminary Report on Patentability and Written Opinion for Application No. PCT/US2012/023043, dated Jul. 30, 2013.
Communication under Rule 71(3) EPC for European Application No. 14 179 187.1 (Jan. 28, 2016).

* cited by examiner

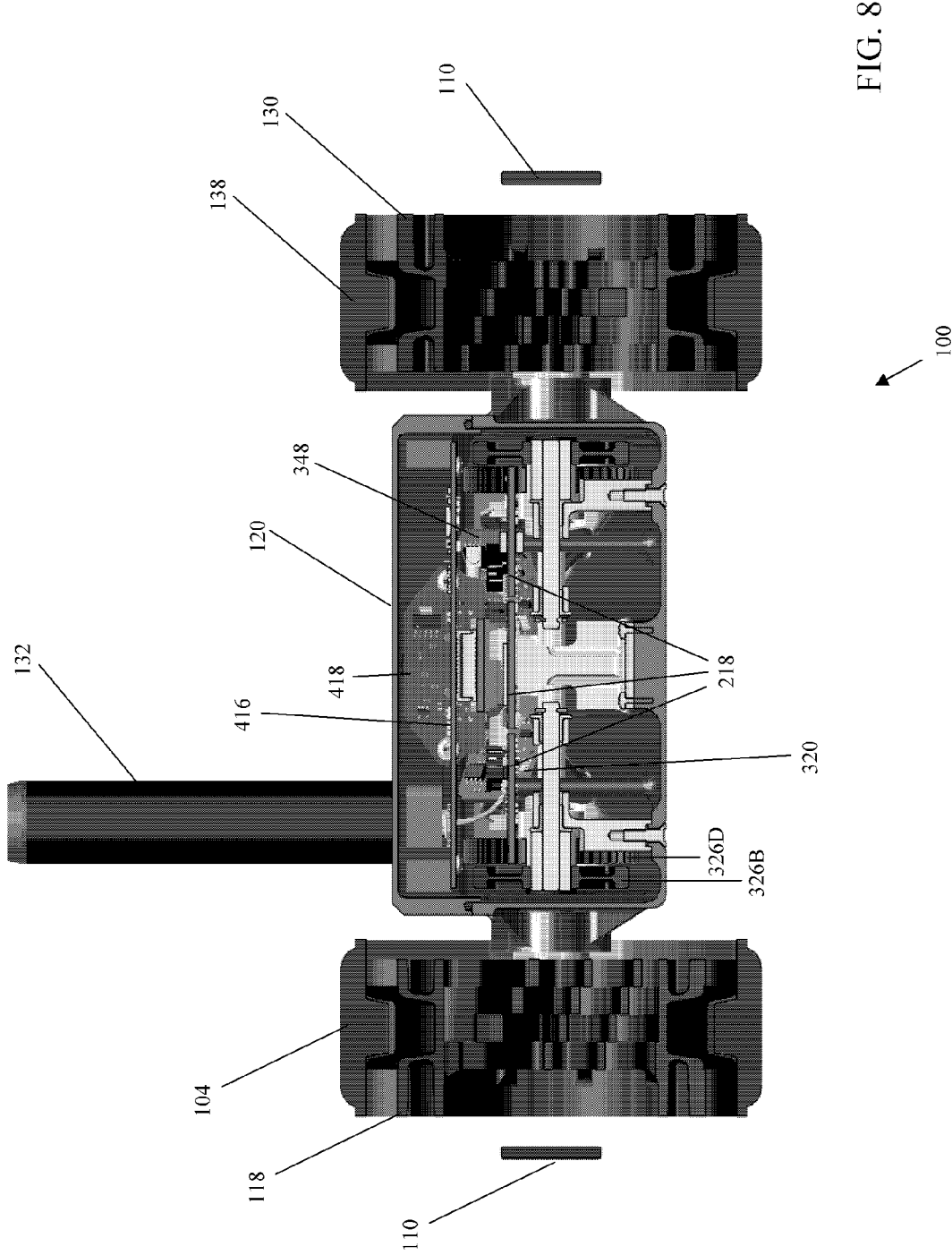

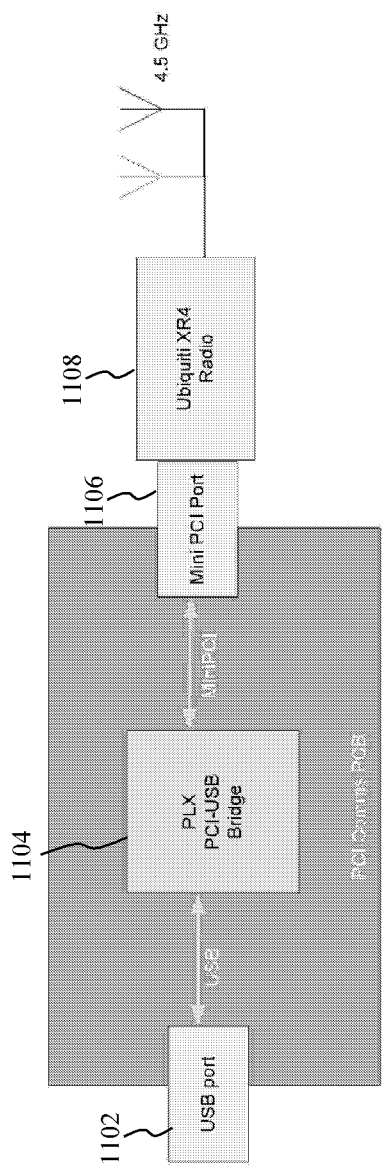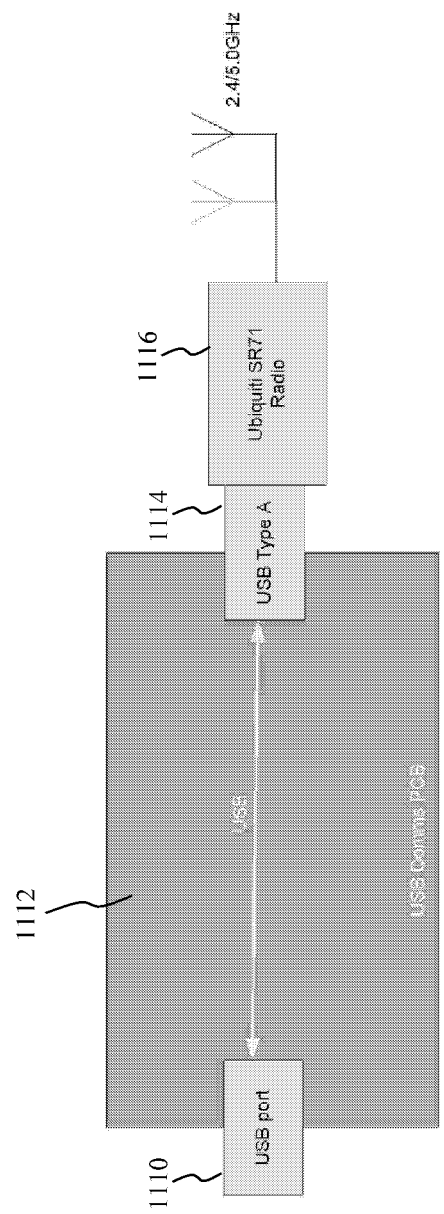

| SPECIFICATION | DESCRIPTION |
|---|---|
| SYSTEM COMPONENTS | FIRSTLOOK ROBOT, OPERATIONAL CONTROL UNIT (OCU), PDA CONTROLLER, AND CHARGING DOCK EQUIPMENT.T |
| PORTABILITY | 10 X 9 X 4 INCHES, APPROXIMATELY FOUR POUNDS. |
| RUGGEDNESS | DESIGNED FOR 15-FOOT DROPS ONTO CONCRETE WITHOUT A PROTECTIVE CASE. |
| WATERPROOF | WATERPROOF TO THREE FEET (IP67). |
| MANEUVERABILITY | CLIMBS STEPS AND CURBS, SELF-RIGHTS WHEN INVERTED, AND TURNS IN PLACE WITH SKID-STEER TRACKS. |
| HIGH SITUATIONAL AWARENESS | FOUR CAMERAS POIT IN ALL FOR CARDINAL DIRECTIONS WITH CONFIGURABLE VIDEO COMPRESSION. |
| NIGHT VISION | IR ILLUMINATION FOR NIGHT OPERATIONS. |
| AUDIO COMMUNICATIONT | TWO-WAY AUDIO. |
| OPERATIONAL CONTROL UNIT (OCU) | WRIST-MOUNTED WITH BUILT-IN RADIO AND BATTERIES TO SUPPORT FULL ROBOT MISSION. |
| RADIO COMMUNICATION | DIGITAL MESH NETWORKING ALLOWS MULTIPLE UNITS TO RELAY MESSAGES OVER GREATER DISTANCES. |
| MILITARY BAND | OPTIONAL 4.5-GHz MILITARY BAND. |
| RUNTIME | OVER SIX HOURS ON A TYPICAL MISSION; AND UP TO 10 HOURS OF STATIONARY VIDEO MONITORING. |
| PAYLOAD EXPANSION | OPTIONAL ROBOT PAYLOAD EXPANSION ALLOWS INTEGRATION OF SPECIALIZED CAMERAS AND SENSORS AND THERMAL IMAGERS, CHEM-BIO-RADATION SENSORS, AND DESTRUCTIVE PAYLOADS UP TO ONE-HALF POUND. |

FIG. 37

SMALL UNMANNED GROUND VEHICLE

This patent application claims priority to U.S. Provisional Patent Application No. 61/442,790, filed May 19, 2011, for Small Unmanned Ground Vehicle, and claims priority to U.S. Provisional Patent Application No. 61/436,994, filed Jan. 27, 2011, for Resilient Wheel Assemblies, the entire content of both applications is incorporated herein by reference.

INTRODUCTION

The present teachings relate generally to a small unmanned ground vehicle. The present teachings relate more particularly to a small unmanned ground vehicle weighing less than about five pounds, and which is designed to absorb an impact from being dropped or thrown and climb stairs of a conventional size.

BACKGROUND

The section headings used herein are for organizational purposes only and are not to be construed as limiting the subject matter described in any way.

In military and industrial settings, personnel often encounter dangerous situations where intelligence of what lies ahead could save lives. Dismounted military patrols can use a lightweight, portable robot to maneuver into small spaces prone to ambush, and inspect potential threats, including suspected improvised explosive devices (IEDs). A small search robot can also be used to assess situations before exposing personnel to harm. In industrial settings, emergency personnel can pre-position or insert a small inspection robot in hazardous spaces to evaluate the situation before humans enter the area. Such a robot can evaluate the extent of danger before rescue teams enter sealed areas in mining operations, chemical plants, or nuclear reactors.

SUMMARY

The present teachings may solve one or more of the above-mentioned problems and/or achieve one or more of the above-mentioned desirable features. Other features and/or advantages may become apparent from the description which follows.

A robot in accordance with embodiments of the present teachings can comprise a lightweight, man-portable search robot designed to help keep military personnel and industrial personnel out of harm's way. It can be deployable and extremely maneuverable, and can serve as a forward-looking eye that travels ahead of dismounted military forces or industrial emergency personnel. Embodiments of the robot can also indicate the presence of IEDs, enemy combatants, and other potential hazards.

The present teachings additionally provide for a mobile robot having a chassis volume. A battery housed within the chassis comprises a battery volume, the battery being configured to support intended missions of the mobile robot for at least 6 hours, the intended missions including at least driving the mobile robot and powering a radio thereon. A driven support surface can be movably connected to each side of the chassis and configured to propel the chassis in at least a forward direction, each driven support surface comprising a flexible track trained about a pair of wheels. A flipper rotatably can be connected to each side of the chassis rearward of the center of gravity of the chassis, the flippers being configured to rotate in a first direction to raise the rearward end of the robot and to rotate in a second and opposite direction to raise the forward end of the robot chassis, and the battery volume can be at least about 10 percent of the total volume of the chassis.

The present teachings additionally provide for a mobile robot comprising a chassis having a forward end, a rearward end, and a center of gravity. A driven support surface is movably connected to each side of the chassis and configured to propel the chassis in at least a forward direction, each driven support surface comprising a flexible track trained about a pair of wheels. A flipper is rotatably connected to each side of the chassis rearward of the center of gravity of the chassis, the flippers being configured to rotate in a first direction to raise the rearward end of the robot and to rotate in a second and opposite direction to raise the forward end of the robot chassis. A sensor located on a side of the chassis and has a field of view in a direction substantially parallel to the ground through a respective track. The flipper has a transparent portion configured to prevent the flipper from blocking at least a portion of the field of sensing of the sensor.

The present teachings additionally provide for a mobile robot comprising a chassis having a top surface, a bottom surface, side surfaces, a front surface and a rear surface. A battery is housed within the chassis and including two or more cylindrical cells, the battery resting on a bottom surface of the housing. A driven support surface is movably connected to each side of the chassis and configured to propel the chassis in at least a forward direction, each driven support surface comprising a flexible track trained about a pair of wheels. A flipper is rotatably connected to each side of the chassis rearward of the center of gravity of the chassis, the flippers being configured to rotate in a first direction to raise the rearward end of the robot and to rotate in a second and opposite direction to raise the forward end of the robot chassis, wherein the bottom surface of the housing is contoured to accommodate a shape of the battery cells and is configured to conduct heat away from the battery by providing additional surface area for heat dissipation.

The present teachings additionally provide for a mobile robot configured comprising a chassis having a forward end, a rearward end, and a center of gravity. A driven support surface is movably connected to each side of the chassis and configured to propel the chassis in at least a forward direction, each driven support surface comprising a flexible track trained about a pair of wheels, each longitudinal support surface having a front end and a rear end, a longitudinal length from the front end to the rear end. A flipper is rotatably connected to each side of the chassis rearward of the center of gravity of the chassis, the flippers being configured to rotate in a first direction to raise the rearward end of the robot and to rotate in a second and opposite direction to raise the forward end of the robot chassis. The mobile robot further comprises a flipper motor, to provide a rotational force to rotate the flipper, and a flipper drive gear, to translate the rotational force from the flipper motor to the flipper.

The present teachings additionally provide for a mobile robot system, comprising a mobile robot and an operator control unit to communicate with the mobile robot. The mobile robot comprises a chassis having a forward end, a rearward end, and a center of gravity; an antenna extending in an upward direction from a top surface of the chassis, the antenna configured to bend for stowage and resiliently return to an upright position when released from stowage, to transmit and receive signals; a driven support surface movably connected to each side of the chassis and configured to propel the chassis in at least a forward direction, each driven support surface comprising a flexible track trained about a pair of wheels, each longitudinal support surface having a front end and a rear end, a longitudinal length from the front end to the rear end; a flipper rotatably connected to each side of the chassis rearward of the center of gravity of the chassis, the flippers being configured to rotate in a first direction to raise the rearward end of the robot and to rotate in a second and opposite direction to raise the forward end of the robot chassis; and a plurality of sensors disposed along an exterior surface of the chassis. The operator control unit further comprises a housing; an antenna, supported by the housing, to transmit to and receive signals from the mobile robot; a display, to provide information regarding the operation of the mobile robot; and an input device, coupled to the display, to receive input to the operator control unit to issue instructions to the mobile robot.

The present teachings additionally provide for a mobile robot system comprising a mobile robot, an operator control unit to communicate with the mobile robot, and a docking station. The mobile robot comprises a chassis having a forward end, a rearward end, and a center of gravity; an antenna extending in an upward direction from a top surface of the chassis, the antenna configured to bend for stowage and resiliently return to an upright position when released from stowage, to transmit and receive signals; a driven support surface movably connected to each side of the chassis and configured to propel the chassis in at least a forward direction, each driven support surface comprising a flexible track trained about a pair of wheels, each longitudinal support surface having a front end and a rear end, a longitudinal length from the front end to the rear end; a flipper rotatably connected to each side of the chassis rearward of the center of gravity of the chassis, the flippers being configured to rotate in a first direction to raise the rearward end of the robot and to rotate in a second and opposite direction to raise the forward end of the robot chassis; and a plurality of sensors disposed along an exterior surface of the chassis. The operator control unit comprises a housing; an antenna, supported by the housing, to transmit to and receive signals from the mobile robot; a display, to provide information regarding the operation of the mobile robot; and an input device, coupled to the display, to receive input to the operator control unit to issue instructions to the mobile robot. The docking station comprises a first portion to accommodate the mobile robot, and a second portion to accommodate the operator control unit, where the robot system can be transported by use of the docking station when the mobile robot and the operator control unit are accommodated into the first and second portions, respectively.

Additional objects and advantages of the present teachings will be set forth in part in the description which follows, and in part will be obvious from the description, or may be learned by practice of the present teachings. The objects and advantages of the present teachings can be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate exemplary embodiments of the present teachings and together with the description, serve to explain the principles of those teachings.

BRIEF DESCRIPTION OF THE DRAWINGS

FIG. 8 is a cross sectional view of the robot of FIG. 1, taken through the drive gears and looking toward a front of the robot.

FIGS. 15A-15B illustrate two exemplary communication PCB diagrams.

FIG. 37 illustrates exemplary general specifications in embodiments of the present teachings.

DESCRIPTION

Reference will now be made in detail to exemplary embodiments of the present teachings, examples of which are illustrated in the accompanying drawings.

The present teachings contemplate a small remote vehicle system, embodied herein for exemplary purposes as a small robot. In an embodiment, the small robot can have a mass of approximately 4 pounds, and can be, for example, about 10" in length×9" in width×4" in height (e.g., without consideration of an extended antenna height). Embodiments of the small robot can include a radio with a 200 meter range and which can function in a designated frequency range or designated frequency ranges, for example 2.4 GHz, 5.4 GHZ, or 4.5 GHz. In certain embodiments of the present teachings, the radio can be compatible with CREW (Counter Radio-controlled improvised explosive devices (RCIED) Electronic Warfare) program specifications. The present teachings also contemplate the use of optional encryption schemes. The radio can be two-way to provide situational awareness.

In various embodiments of the present teachings, the robot can be ruggedized, for example, to withstand a fall from a height of greater than 3 meters, to tumble down stairs, and/or to be waterproof. The robot can exhibit excellent mobility characteristics including the ability to climb 8" obstacles and to maneuver in common urban terrain, including navigation of stairs, curbs, and gravel. The robot system can be capable of ground speeds of greater than 1.5 m/s (5.4 kph) using wheels, treads, tracks, or other propulsion devices. In certain embodiments, a long-lasting power supply and energy conservation capabilities can provide up to 11 km driving distance, and/or up to 8 hours performance in a surveillance mode.

Figure 33:
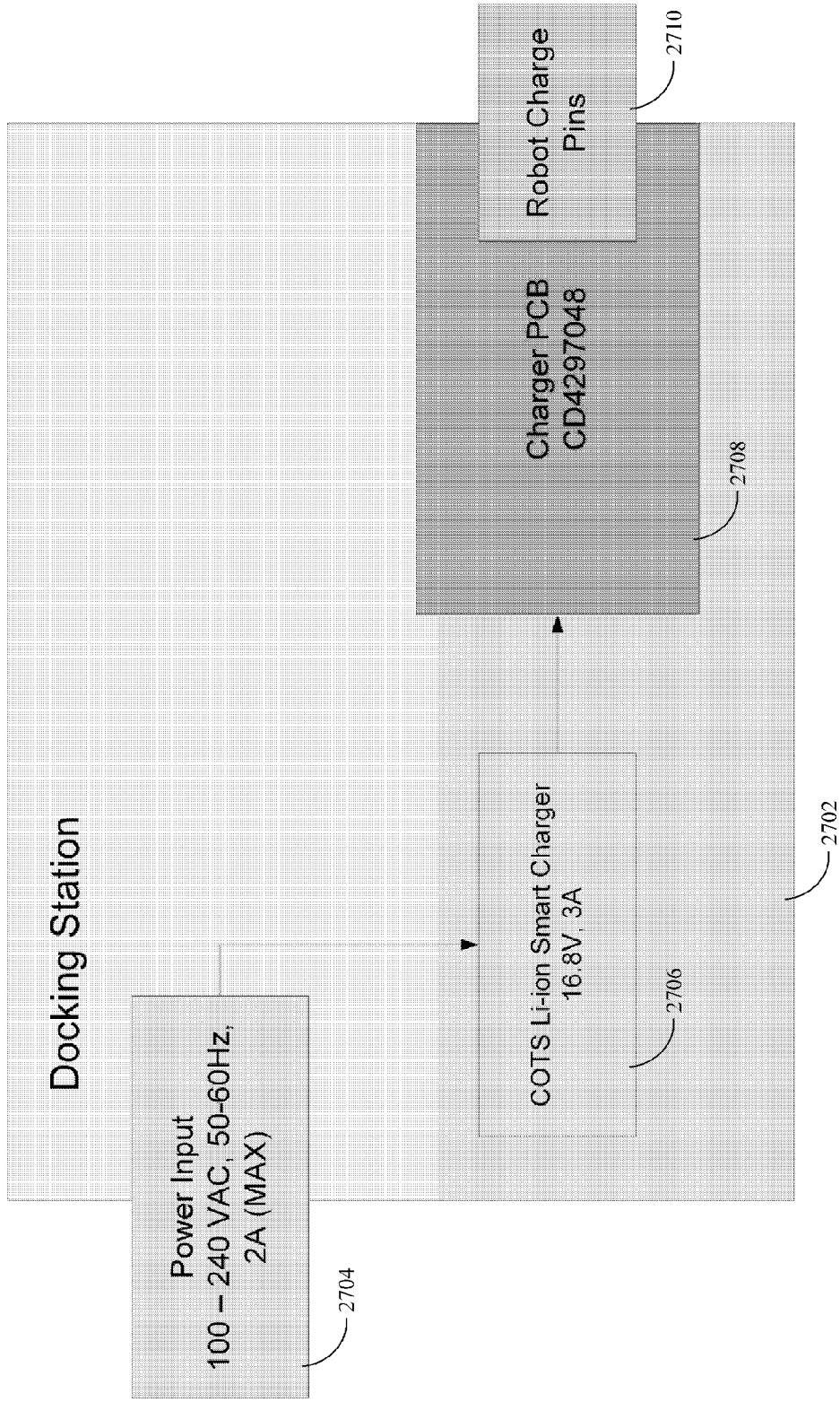
FIG. 33 is a system diagram for an embodiment of a robot docking station and charger.

Embodiments of the robot system can include cameras, infrared (IR) illuminators, and sensors to provide situational awareness. When used with a two-way radio or other communication capability, the robot system can provide a user with extended situational awareness. In certain embodiments of the present teachings, an operator control unit (OCU) can provide wireless command and control over the robot system, which can be highly portable and ruggedized for, for example, combat scenarios. Embodiments of the OCU can include a touchscreen or other input device, and can further provided a device to allow attachment of the OCU to an operator's wrist. The robot system can also be configured to communicate with other robot systems, including the capability of forming ad-hoc communication networks, including mesh networking and "bucket brigade" (i.e., daisy chained communication) to extend a communication range through use of a plurality of robot systems. The robot system can further be configured to perform a variety of behaviors autonomously or semi-autonomously, including self-righting, step climbing, cliff avoidance, wall and obstacle avoidance and navigation, wall following, and retro-traverse behaviors. A plurality of robot systems can also perform maneuvers cooperatively, to accomplish tasks a single robot system would be unable to perform. For example, one or more robots in accordance with the present teachings can be interoperable with an entire fleet of robots and controllers allowing one operator to control many robots. Interoperability can enable cooperative and marsupial missions involving heterogeneous robot platforms using, for example, an advance behavior engine such as iRobot's® Aware® 2 Robot Intelligence Software technology. Robot interoperability can facilitate providing cost-effective, multi-robot systems that can adapt to a wide variety of real-world challenges. An example of general specifications of a small robot in accordance with embodiments of the present teachings is illustrated in FIG. 33.

Figures 35, 36:
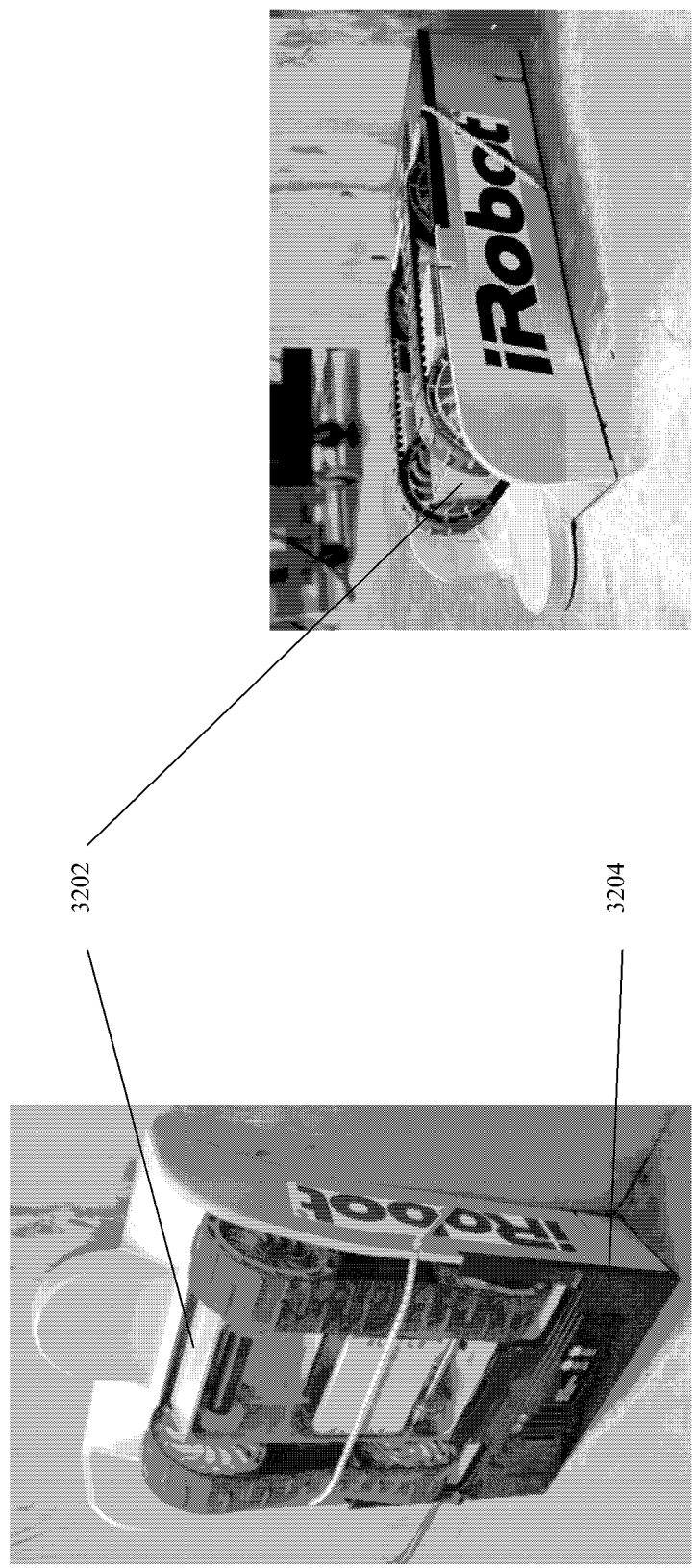
FIGS. 35-36 illustrate a robot system with an exemplary storage/charging dock.

FIGS. 35 and 36 illustrate a robot system with an exemplary storage/charging dock in accordance with the present teachings which can comprise, for example, a robot 3202 and charging dock equipment 3204. In embodiments, an operator control system (not illustrated in FIGS. 35 and 36) can also be included. Prior to using the robot system, batteries of the robot system can be charged while the robot 3202 is secured in the charging dock equipment 3204. The robot 3202 and controller can be removed from the charging dock and stowed in a backpack, vest-mounted pouch, or similar carrying device. The robot 3202 can remain conveniently stowed away until needed for a reconnaissance or other mission. When needed, the robot is removed from its carrying compartment 3204 and activated. The robot 3202 can be a throwable robot and can be tossed down a corridor, into a window, or up a stairwell. The robot can absorb impact forces as described above and, after landing, can right itself if necessary and be remotely operated. Video feed can be evaluated before determining the next course of action.

Using a robot in accordance with the present teachings can reduce collateral casualties by allowing military personnel to determine a degree of hostile intent before entering a dangerous environment. The robot can also look for and determine the presence of IEDs and other safety hazards. In certain embodiments of the present teachings, utilizing several robots can extend a range of operations by acting as communication-relay nodes. A wider area of communication coverage can be provided if a robot is tossed onto a roof top or other high locations with good visibility.

For certain applications, a system in accordance with the present teachings that includes a docking station can be permanently installed at floor level inside a containment building, where the robot can charge in its charging dock (see above) until needed to perform a mission in the building or elsewhere. When an incident occurs, remote personnel can deploy the robot from its charging dock to evaluate, for example, the extent and type of an incident. The robot can, in certain embodiments, autonomously return to its charging dock when the mission is completed. Indeed, the present teachings contemplate a remote vehicle that can be remotely deployed from its charging station and autonomously return thereto, requiring no on-site human intervention.

In an exemplary use, in a civilian industrial setting, a home or building inspector can keep the robot in a wall-mounted charging dock inside an equipment truck until needed. When arriving on site, the robot can be charged and ready for deployment. The inspector can remove the robot from its charging dock and deploy it for evaluation tasks, especially for tasks in areas difficult or dangerous to reach, such as under-house or storm drainage system inspection. After use, the robot can be returned to its charging dock.

Various embodiments of a system in accordance with the present teachings, including training documentation, can fit into a small box weighing less than ten pounds, and can be easily shipped. Optionally, the system can be shipped or carried in, for example, a rugged waterproof case, commonly referred to as a Pelican case. Certain embodiments of the robot have a small form factor with two tracks, similar to a small tank. The robot preferably has side flippers, which in certain embodiments can rotate 360° around their axles to assist the robot in stair climbing, obstacle surmounting, self-righting, and certain other behaviors.

In various embodiments of the present teachings, the robot can climb stairs and curbs. The robot's platform can be, for example, about 10×9×4 inches, weigh about four pounds, and can be dropped fifteen feet onto a hard/inelastic surface (e.g., a concrete floor) without incurring structural damage that may impede its mission. For power, the robot can use, for example, built-in rechargeable lithium ion batteries, which can support typical mission durations of in excess of six hours. Certain embodiments of the robot can contain a small payload interface on top where optional sensors, manipulators, or other payloads can be attached. Certain embodiments of the robot can, for example, accommodate a payload of up to 0.5 pound without impeded mobility. In accordance with various embodiments, the robot's motor can provide a top speed near 1.5 m/sec (3.4 mph). Exemplary embodiments of such robots are further described in U.S. patent application Ser. No. 13/052,022, filed Mar. 18, 2011, for MOBILE ROBOT SYSTEMS AND METHODS, which is herein incorporated by reference in its entirety.

In various embodiments, the robot's primary processor system can comprise an ARM processor, which can handle processing of commands and telemetry (which can be, for example, JAUS/SAE AS-4 compliant), motor-control loops, video processing and compression, and assistive autonomous behaviors implemented in an advanced behavior engine such as iRobot®'s Aware® software architecture. The robot can optionally be configured to be compliant and/or compatible with various robot interface standards, including JAUS and SAE AS-4.

In certain embodiments, a set of sensors for perceiving terrain (e.g., obstacles, cliffs and walls), inclinations, and orientation can be utilized to assist the operator with common tasks such as obstacle detection and avoidance, wall following, and cliff avoidance, relieving the need for difficult and intensive teleoperation during such tasks as driving in a straight line in a in a walled space and self-righting. The robot can interoperate with other robot products and compatible operator control units (OCUs). Interoperability can allow the same OCU to operate two robots (of the same type or a different type) simultaneously.

In accordance with various embodiments, a small, wrist-mounted OCU includes a radio, an antenna, and a battery capacity to accommodate the robot's mission life. The OCU can, for example, measure 6.5×4.5×2 inches, weigh approximately one pound, and conveniently stow in pockets such as the cargo pocket of a military uniform. The OCU can, for example, display all of the robot's real-time video streams simultaneously, allow direct control of the robot, and allow initiation of assorted autonomous and/or semi-autonomous behaviors. The OCU can additionally display, for example, the status of the robot's systems, including battery state of charge and flipper mechanism position. In various embodiments, the OCU can be weather resistant and configured to operate, for example, over a −10° C. to 50° C. temperature range.

Figure 1:
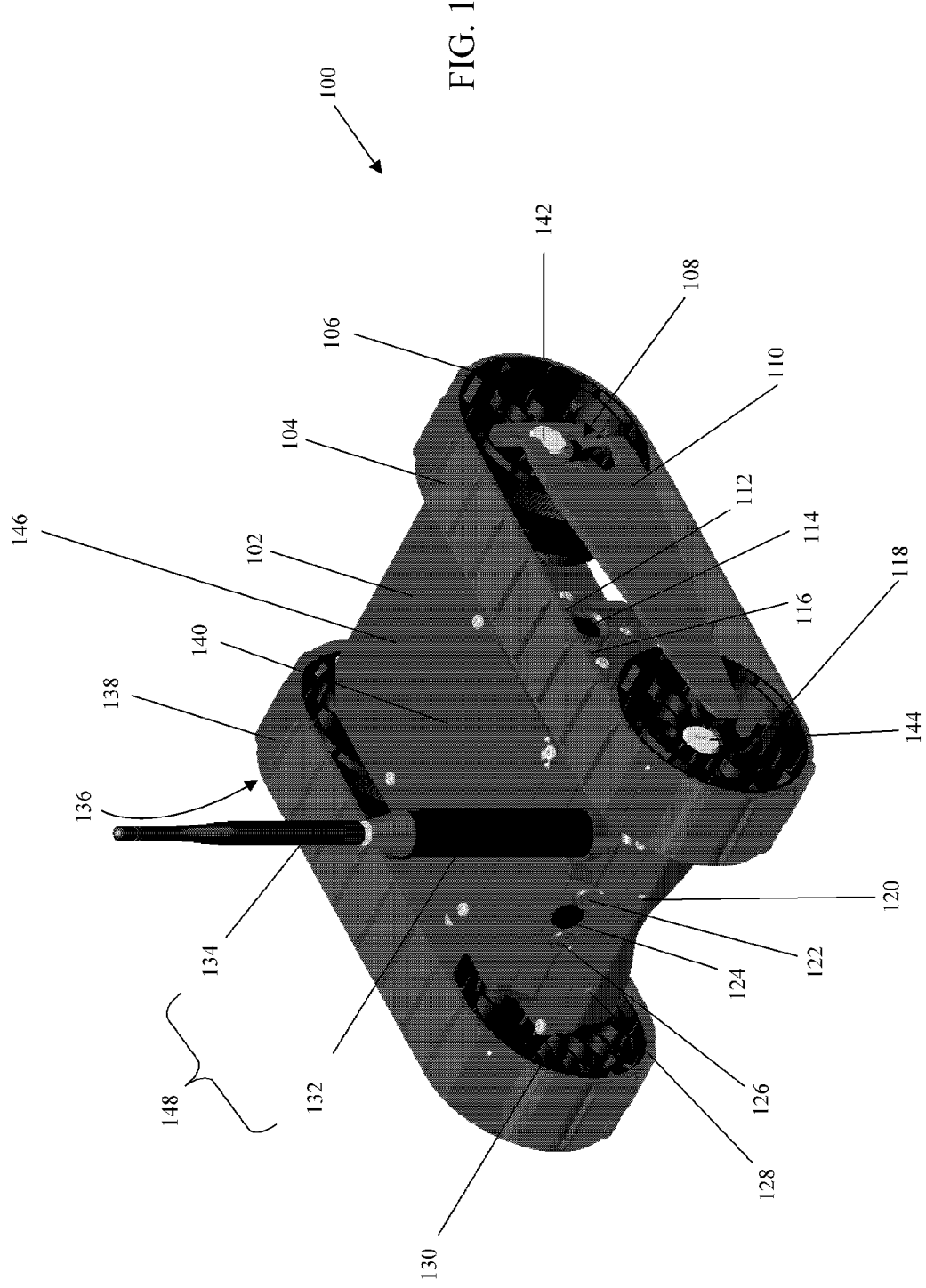
FIG. 1 is a side perspective view of an exemplary embodiment of a robot in accordance with the present teachings.

A robot in accordance with the present teachings is preferably a small, light-weight, tracked vehicle with trackless flippers as shown in FIG. 1. The flippers can be mounted to a rear axle of the robot. In accordance with various embodiments, when the flippers are stowed, the robot can be, for example about the size of a large telephone book, and can fit into an assault pack. The robot's small form factor and light weight can lend it well to dropping throwing into restricted spaces; and no external protective device is needed to protect the robot upon landing. The present teachings contemplate several robots being carried in a single backpack. In various embodiments of the present teachings, a small, ruggedized, PDA-style controller can be provided with the robot. The controller can weigh, for example, about one pound. The robot's charging dock can, for example, fit in an assault pack with the robot and its controller.

Various robots in accordance with the present teachings provide the smallest robot that can climb stairs, street curbs, and other obstacles common in urban environments. Such climbing is accomplished with the flippers as shown and described above. Embodiments of the robot can have, as illustrated herein, four wheels, rubber elastic tracks, and a flat brick-shaped body. The flippers are capable of continuous 360-degree rotation in both directions. The flippers can self-right the robot if it inverts, and can help the robot to overcome a wide variety of obstacles that typically obstruct a small robot. Such robots are further described in the aforementioned U.S. patent application Ser. No. 13/052,022, which is incorporated by reference herein in its entirety.

Certain embodiments of robot systems in accordance with the present teachings can climb stairs and crawl over rough terrain without getting stuck in rubble and debris. Certain embodiments of the robot can climb 60° slopes, and traverse 45° slopes. In various embodiments, the flippers can help the robot cross gaps over six inches in length. The tracked drive train can, in some embodiments, move the robot at speeds in excess of 1.5 meters/sec. The flipper system provides a high degree of mobility. The flippers' 360-degree rotation allows the robot to "swim" over rubble piles and rugged terrain that typically stop small robots with low ground clearance. The flippers can also self-right the robot when it is thrown or dropped onto a hard surface. The flipper-based self-righting feature allows the robot to self right even when its radio antennas and payloads such as sensors are designed into the top of the robot for appropriate visibility. The ability to position payloads and antennas on top of the robot is not available on existing invertible robot systems that do not have flippers.

Various embodiments of a robot in accordance with the present teachings are waterproof to IP67, and operate over a wide temperature range. The robot's low form factor can make it resistant to very high winds, in excess of 45 mph, with little degradation of mission performance. As stated above, embodiments of the robot can operate in temperatures ranging from −10° C. to 60° C., with the operational temperature range being largely dictated by current lithium ion battery technology.

In certain embodiments, video is provided through four small multi-megapixel cameras built into the robot. Each camera can be pointed in a cardinal direction (front, back, left, and right) to allow full situational awareness, and can have a sufficient field of view to ensure full situational awareness. In certain embodiments, the operator can digitally pan-tilt and zoom within this field of view, take snapshots, and records videos for purposes of collecting intelligence data. The cameras preferably tolerate full sun, and do not wash out images. For low-light or night operations, an IR illumination array can be utilized to provide sufficient illumination to operate in typical urban situations.

In certain embodiments, to preserve true daylight colors, the camera lenses can have infrared (IR) cut filters with a notch band for the specific wavelength of the IR illumination. This can eliminate most ambient daylight IR light, preventing the washed out colors common in lenses with IR cut filters removed.

In various embodiments, the batteries can support over two hours of continuous, full-speed driving, or up to 10 hours of stationary observation, while transmitting full-motion video. In an embodiment, each battery can include one or more metal ion rechargeable batteries, for example, eight cells in a two-parallel, four-series configuration of, for example, 18650 cell-style lithium ion batteries. In various embodiments, a battery stack can be built into the robot, allowing the robot to be smaller, lighter, more rugged, and cheaper to build with fewer potential leak points than with a user-replaceable battery pack. A built-in battery design can eliminate duplicate bulkheads and seals that are typically needed for a user-replaceable battery compartment. The small size and light weight of lithium ion batteries allow the robot to be shipped by common air carrier without special hazardous materials packaging. For example, embodiments of the robot with eight Li-ion cells contain less than eight total grams of lithium.

The robot charging dock can utilize a continuously-available power source such as, for example, a wall socket electrical supply in the range of 110-250V AC 50-60 Hz. The robot can also operate using an optional 12-28 VDC charger. The small size and low cost of the robot will allow personnel to carry spare robots instead of spare batteries, if extended mission runtime is expected.

The robot's radio can comprise, for example, a USB module, and can support bi-directional digital communication and mobile ad hoc mesh networking. The default radio can operate on a frequency of 5.8 GHz, and have a line-of-sight range in excess of 200 meters. The radio can also support operations on 2.4 GHz, or can be replaced to support a wider variety of frequencies. The robot can optionally be equipped with a radio supporting a military band of 4.475-4.725 GHz with 200 m range. The radio can be connected to a flexible antenna mounted on top of the robot with a unique collapsible mast such as the mast disclosed in U.S. patent application Ser. No. 13/340,456, filed Dec. 29, 2011, for Antenna Support Structure, the entire disclosure of which is incorporated by reference herein. When the robot flips over or onto its side, autonomous self-righting behavior self-rights the robot to allow such a flexible antenna to regain its upright position. The radio can comprise, for example, a bi-directional 802.11 class radio relying on greater than a 900 MHz bandwidth.

In accordance with certain aspects of the present teachings, in areas where RF performance may be degraded by background noise, or obstructed by terrain, several robots can be used together as relay nodes to extend the operational range. If the first robot reaches its RF communications limit, a second robot can be deployed to drive past the first robot into an inaccessible area, utilizing the first robot as a radio-relay node. The mesh networking capability can be built into some embodiments of the robot.

In certain embodiments, sensors on the robot can measure, for example: battery state of charge; voltage; amperage; tilt/inclination and bump sensing; cliff detection; wall following; yaw-angular rate to detect slippage and enhance odometry; motor currents; and flipper position. The robot can have on-board logging of diagnostic data, and can warn the operator of potential impending system failures requiring maintenance. The robot's autonomous capabilities can include, for example, one or more of the following.

Self-righting—a built-in, autonomous, self-righting behavior. When the robot is on and left undisturbed in an inverted position, the flippers activate in a series of maneuvers to upright the robot to ensure that the robot is returned to the upright position.

Step climbing—the robot can climb steps, preferably almost as deep as its size. However, the sequence of events that needs to occur to successfully surmount a large step is not trivial to perform when the motors are directly controlled by the operator. To facilitate step climbing, the robot can have a built-in assistive behavior initiated by the remote operator once the robot is positioned in front of the step. The assistive behavior executes the sequence of motions required to climb the step based upon the feedback from appropriate internal sensors. Further examples of such step climbing can be found in the aforementioned U.S. patent application Ser. No. 13/052,022.

Cliff detection—due to the low perspective of the robot's cameras, it is often difficult for an operator to see when the robot is driving towards a drop off, such as the top of a flight of stairs or the edge of a platform. To assist the operator in such situations, the robot can have built-in cliff sensors that are utilized in a protected driving mode. If the operator drives the robot too close to the edge of a stairwell or cliff, the robot stops, and can verify that the operator is aware of the drop off by projecting a warning message on the OCU. The operator can then decide to turn away from the edge, or to proceed and drive over the ledge.

Wall following—to facilitate searching a room or space, the operator can command the robot to follow a wall clockwise or counter clockwise around a room's perimeter. The robot autonomously drives around the perimeter hugging the base of the wall.

Video Guard Mode—the robot can be configured in a low-power, standby mode. In this mode, the robot wakes up and transmits an alert if it sees any motion. This mode can be useful when securing an area in a leave-behind scenario.

Certain embodiments of the robot can contain an expansion port for the addition of future payload modules where optional sensors, manipulators, or destructive payloads are attached. The robot can, for example, accommodate a payload of up to 0.5 pound without impeded mobility. Payload expansion can allow integration of specialized cameras and sensors, including thermal imagers, chem-bio-radiation sensors, and destructive payloads.

FIG. 1 is a side perspective view of an exemplary embodiment of a robot 100 in accordance with the present teachings. As shown, the robot 100 includes a housing 102 having wheels 106, 118, 130 and 136 on each side thereof and tracks 104, 138 spanning a front wheel and a rear wheel. The housing 102 can comprise, for example, aluminum or another suitably durable material including other metals, plastics, composites, etc. Flippers 110 can be provided, for example, attached directly or indirectly to a rear axle 142 of the vehicle (i.e., a rear axle spanning wheels 106 and 136), and can be rotatable, for example through 360 degrees, about the rear axle 142. The flippers 110 can be made from a suitably rugged material to withstand impacts that the robot may incur in use, and can be suitably strong to lift the weight of the robot and any payloads or accessories attached thereto. The flippers 110 can extend, for example, from rear axle 142 (at the flippers' proximal ends) to front axle 144 (at the flippers' distal ends), and can be tapered to be wider at their proximal ends and thinner at their distal ends. The distal end can be, for example, rounded as illustrated. The flippers 110 preferably extend generally parallel to a side of the robot when in a stored state and spaced from the robot a distance that prevents interference of the flipper with a motion of the robot or other operations of the robot while also preventing the flipper from catching on objects in the robot's environment. Flippers 110 can be mounted to the rear wheel assembly via, for example, a four-bar linkage 108 that is further described below. As will be appreciated by those of ordinary skill in the art, the robot 100 will have a center of gravity between the front axle 144 and the rear axle 142, and between tracks 104, 138

In certain embodiments of the present teachings, a top surface 146 of the robot housing 102 lies slightly below the surface of the tracks 104 and 138, and is substantially flat. The top surface 146 can include a payload expansion port cover 140 that can be removed to attach a payload to the robot, but which can optionally also serve as a surface for a sound exciter, as discussed in further detail below.

As illustrated in FIG. 1, an antenna assembly 148 extends upwardly from a top surface of the robot housing. The antenna assembly 148 can comprise, for example, an antenna mast 132 and an antenna 134. The antenna mast 132 can be, for example, bendable and resilient, and may, for example, comprise a rubber tube or an arrangement of shape memory alloy elements. In operation, antenna mast 132 can be folded over the robot housing 102 for compact storage. Such an antenna 134, mast 132 and assembly 148 are further described in U.S. patent application Ser. No. 13/340,456, filed Dec. 29, 2011, for Antenna Support Structure, the entire disclosure of which is incorporated by reference herein.

In the illustrated robot 100, many features of the robot can be designed to absorb an impact that the robot may receive if dropped or thrown. For example, antenna mast 132 can be bendable and resilient to absorb impact by folding. In addition, wheels 106, 118, 130 and 136 can have spiral spokes to absorb radial impact and/or slotted spokes to absorb axial impact. The flippers, such as flipper 110, can be attached to the rear axle 142 by a four-bar linkage 108 allowing the flipper to better absorb side impact. Such wheels and flippers are further described in U.S. patent application Ser. No. 13/340,957, filed Dec. 30, 2011, for Resilient Wheel Assemblies, which is incorporated by reference herein in its entirety.

Embodiments of the robot 100 can include cameras 114, 124 on the sides, front, and/or back of the robot, the cameras 114, 124 providing an operator with situational awareness. Each camera 114, 124 can optionally be provided with an IR LED (e.g., an IR LED on each side of the camera) for low-light operation. Exemplary front camera 124 with IR LEDs 122 and 126 and exemplary left-side camera 114 with IR LEDs 112, 116 are illustrated in FIG. 1.

The left flipper 110 in FIG. 1 is illustrated in its stowed position, such that it extends from the rear axle 142 of the robot 100 toward the front axle 144 of the robot. In certain embodiments of the present teachings, the flipper 110 covers the side camera 114 when in a stowed position (see FIG. 2), which could potentially cause an operator to lose some situational awareness when the flipper rests in or passes through the illustrated stowed position. Such loss of situational awareness can be substantially prevented by operating the vehicle with the flippers in a position that does not cover the side cameras. Certain embodiments of the present teachings contemplate providing a cutaway, hole, or transparent portion for flipper 110, configured to prevent the flipper from blocking at least a portion of the field of view of the side camera 114, IR LED 112, 116, and/or a wall-following sensor located adjacent thereto, thereabove, or thereunder.

The antenna mast 132 (or in some embodiments, antenna assembly 148) being bendable and resilient additionally allows the robot to drive under objects with a clearance less than its antenna height, and perform a self-righting maneuver more easily because the flippers need not overcome the height of the mast to flip the robot over. Further, the height of the antenna assembly 148 (i.e., the height of the antenna mast 132, the antenna 134, or both) can be selected to allow a desired communication range with the operator control unit, which, for example, can be a 200 meter-to-300 meter range. In certain embodiments of the present teachings, the antenna assembly 148 can be positioned toward a front end of the robot to facilitate stair climbing, so that the weight of the antenna moves the center-of-gravity of the robot forward, helping the front end of the robot tip forward as, for example, it surmounts the stair riser. The size of the robot can be configured to accommodate the size of the antenna. For example, the robot can be sized so that the antenna can rest on and be supported on a top surface 146 of the robot housing 102. In various embodiments, the top surface 146 of housing 102 can be lower than the top of tracks 104 and 138 to form a gap above the top surface 146 and between the tracks 104, 138. In such embodiments, the antenna can bend or fold to fit within a gap between the top of the housing and the tracks, so that the antenna, when folded over, is no higher than the top of the tracks 104, 138. Further, the antenna can be sized so that, when folded over, it does not extend beyond the back of the housing 102. This can protect the antenna during storage, during rollover, or when the robot is passing under a low object.

FIG. 1 also illustrates cliff sensors 120, 128 under the camera 124 and IR LEDs 122, 126 on the front of the robot. Cliff sensors 120, 128 can also be provided at the rear of the robot, particularly if the robot can drive in a reverse direction. In various embodiments, a wall-following sensor can also be provided on each side of the robot, for example under each side camera 114 and side IR LEDs 112, 116.

In certain embodiments of the present teachings, the robot can have a front-to-back overall length of about 260 millimeters. The distance between the front and rear axles can be about 165 millimeters. The height of the robot excluding the antenna can be about 95 millimeters. The height of the robot including the antenna can be about 307 millimeters, indicating that embodiments of the antenna can extend about 211 millimeters above the robot, although the actual height of the antenna in the illustrated embodiment is greater than 211 millimeters because the antenna is slightly recessed below the top track. The width of the robot can be about 224 millimeters between flipper external surfaces and about 204 millimeters between track outer edges.

Figure 2:
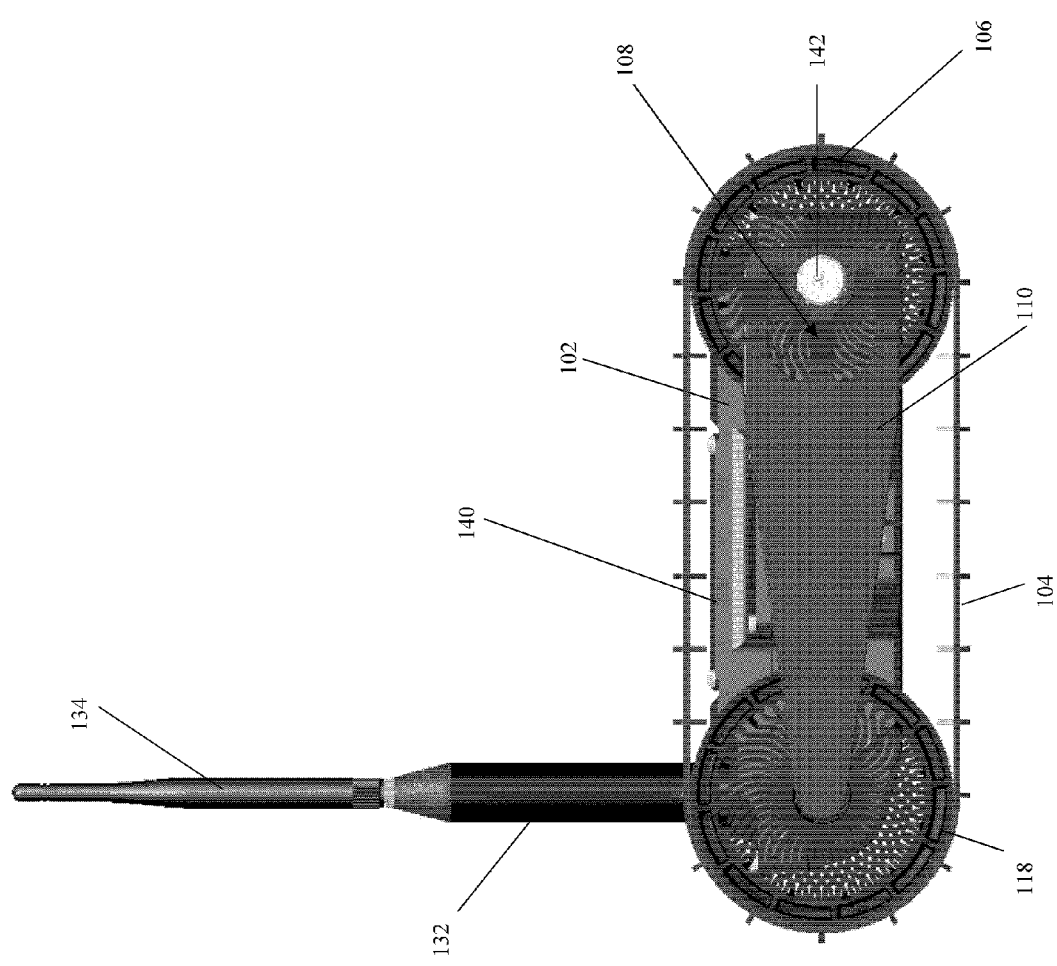
FIG. 2 is a side view of the embodiment of FIG. 1.

FIG. 2 is a side view of the embodiment illustrated in FIG. 1, illustrating an exemplary size and shape of the flipper 110 and its four-bar linkage 108 where it mounts to the rear axle 142 of the robot 100. FIG. 2 also illustrates that, in a stowed position, the flipper 110 can cover the side camera 114 and IR LEDs 112, 116. A wall-following sensor, when available on the robot, may also be covered by flipper 110. The present teachings contemplate flippers comprising a necked taper or other accommodation (not shown) to reduce coverage of the cameras and/or wall sensors.

Figure 3:
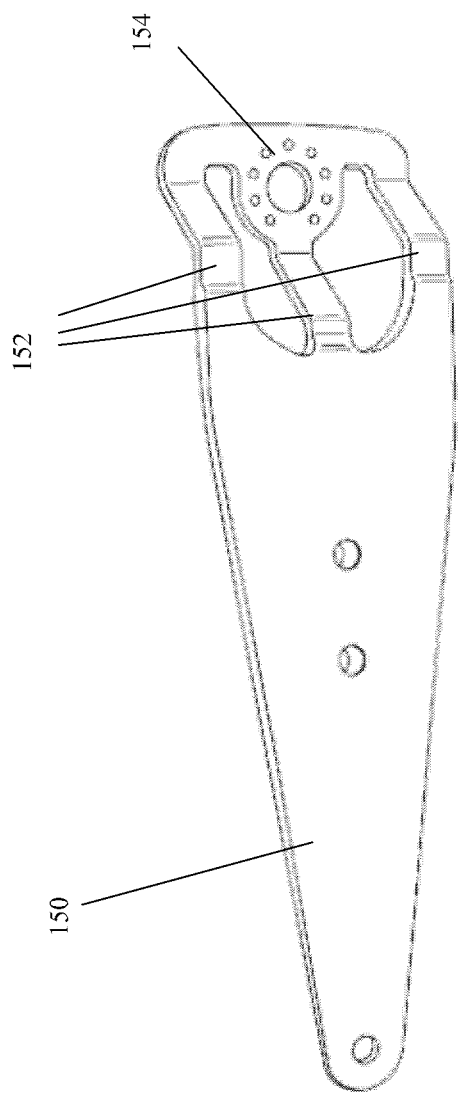
FIG. 3 is a perspective view of an exemplary embodiment of a flipper structure in accordance with the present teachings

FIG. 3 is a perspective view of an exemplary embodiment of a flipper structure in accordance with the present teachings. The flipper structure may comprise, for example, an arm 150, a plurality of legs 152, and an attachment base 154.

As shown in FIGS. 1 and 2, for example, when the flipper structure is attached to a remote vehicle, such as, for example, a remote vehicle 100, the flipper 110 may extend longitudinally along the side of the remote vehicle 100. The legs 152 and base 154 comprise a four-bar linkage which can flex to allow an outer surface of the flipper 110 to remain substantially parallel to the robot even when the flipper 110 deflects in response to a side-impact force. Flipper structures and linkages are further described in U.S. patent application Ser. No. 13/340,957, filed Dec. 30, 2011, for Resilient Wheel Assemblies, which is incorporated by reference herein in its entirety.

Figure 4:
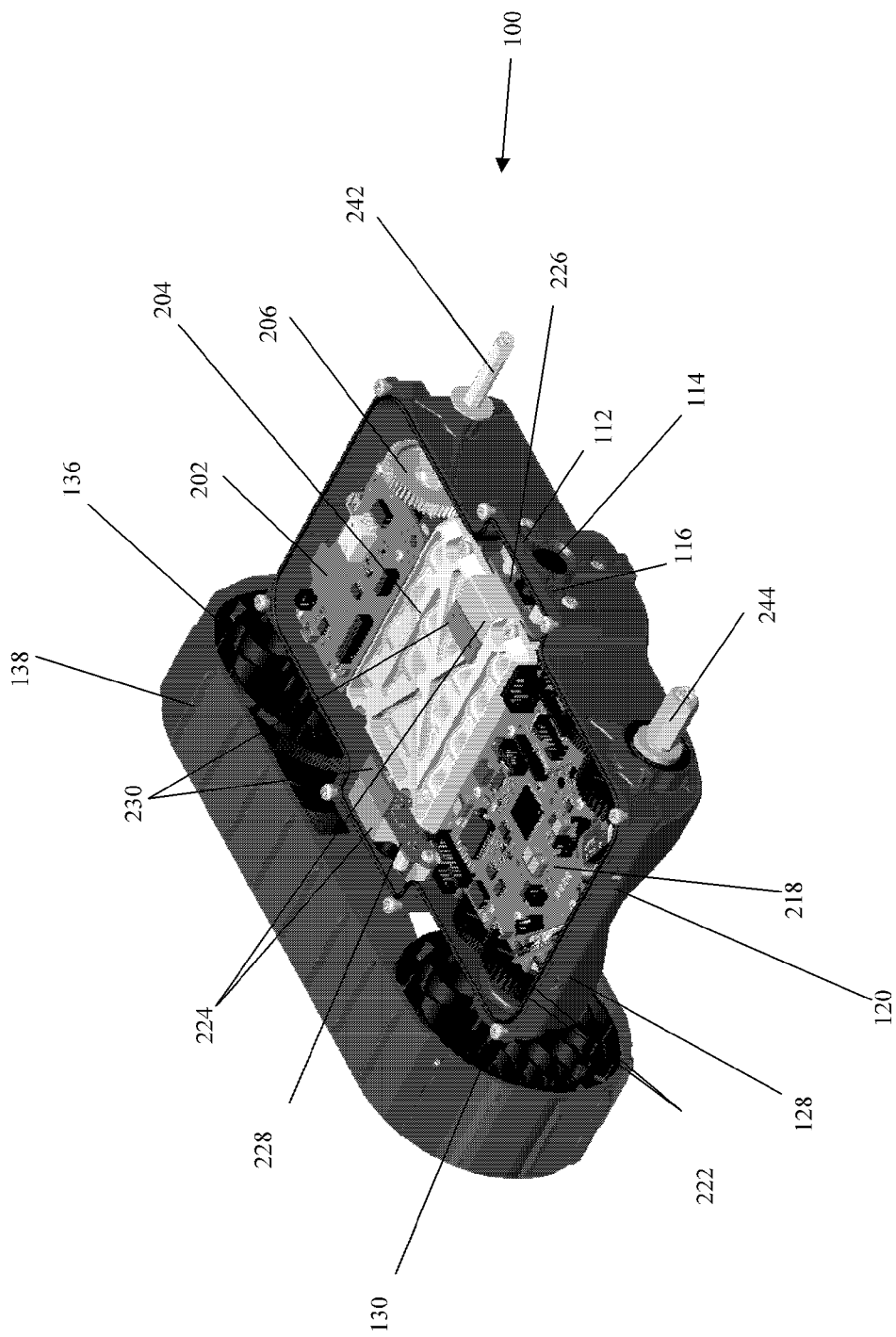
FIG. 4 is a side perspective view of the embodiment of FIG. 1, with the cover, antenna, left flipper, left wheels, and left track removed.

FIG. 4 illustrates a side perspective view of the robot embodiment of FIG. 1, with the cover, antenna, left flipper, left wheels, and left track removed to show an interior of the robot. A battery (not visible in FIG. 4) can be centrally located and housed, for example, between a bottom of the robot and battery cover 204. The battery can be, for example, a 14.8V 5.6 Ah (82.88 Wh) Lithium-ion battery with a PCB, for example an 8-cell battery. The battery can weigh, for example, about 385 grams (13.6 ounces). The present teachings contemplate utilizing any battery that can provide enough power to maintain the power needs of the robot for at least the desired mission length of about 6-10 hours, and that is small enough to accommodate the small form factor of the robot.

FIG. 4 also illustrates a mobility board (PCB) 218 located at a forward position in the robot 100. The mobility board 218 can control motors (for example, within casing 310 illustrated in FIG. 5) to drive the front axle 244, and can receive input from sensors such as one or more gyros, accelerometers, sensors for a side-of-shaft magnetic encoder for odometry, temperature sensors for each front wheel drive motor, and power monitoring electronics. The mobility board 218 can be coupled to cliff sensors 120, 128, which are illustrated on a bottom portion of the front of the robot housing.

A flipper board (PCB) 202 can be provided on a rear side of the battery cover 204. The flipper board 202 can control a flipper motor and can also receive input from, for example, temperature sensors monitoring a flipper motor temperature and a temperature of a shell (housing) of the robot. An application board (such as application board 416 in FIG. 8) can be provided above the battery cover 204. The application board can be seen in cross section in FIGS. 4, 6, and 9, and is illustrated schematically in FIG. 15. The application board 416 can be connected to the mobility board 218 and the flipper board 202, and also to camera PCBs (such as camera PCB 418 in FIGS. 8 and 626 in FIG. 12). For example, flexible cables 224 and connectors 230 can be used to connect the camera PCBs 226, 228 to the application board.

Front axle 244 and rear axle 242 are illustrated exposed in FIG. 4, and drive gear assembly 222 for the front wheels is partially visible on a side of the mobility board 218. A portion of the flipper clutch 206 is illustrated in FIG. 4 on a side of the flipper board 202, and is further described below.

Figure 5:
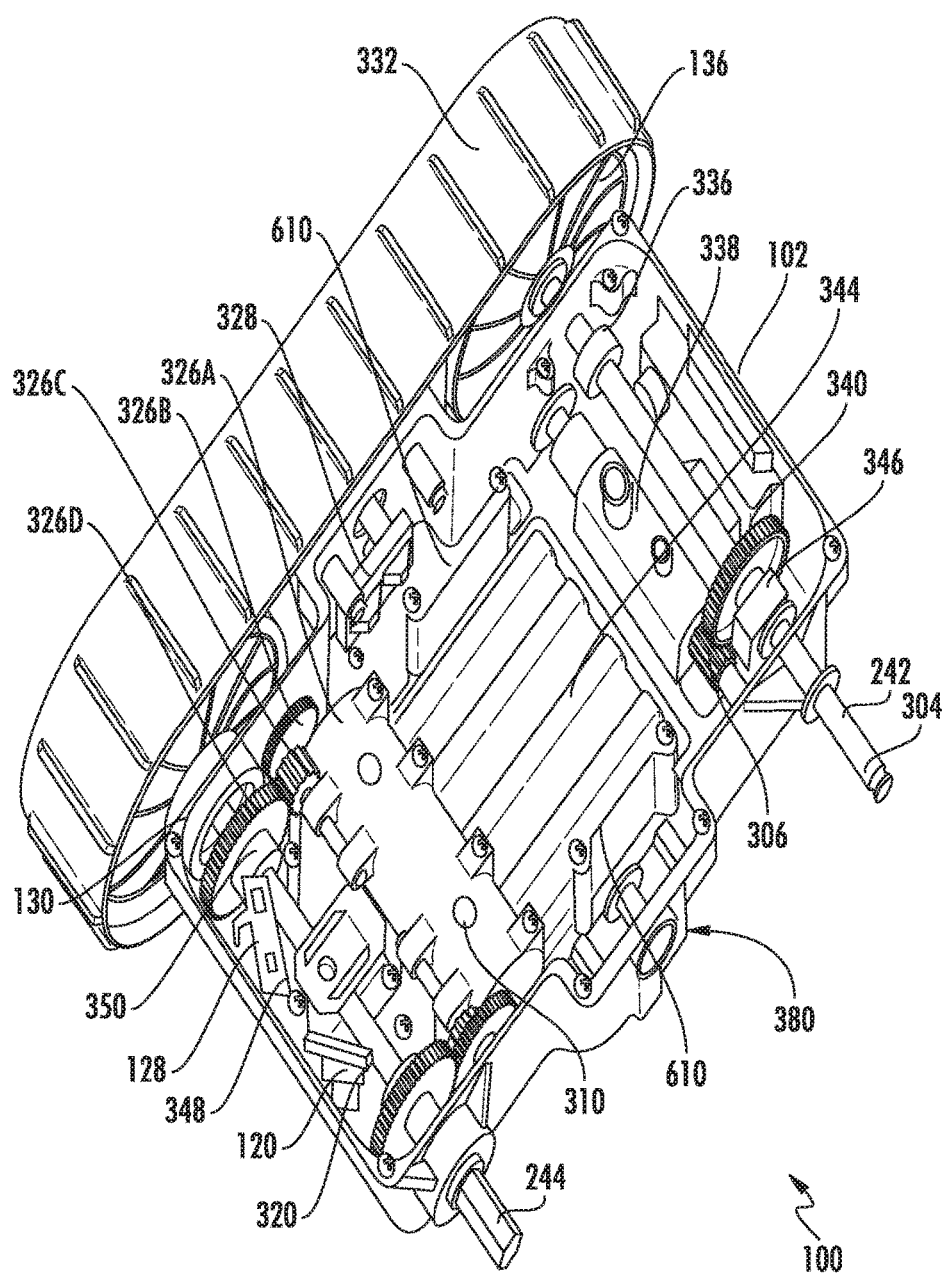
FIG. 5 is a top perspective view of the embodiment of FIG. 1, showing the cover, antenna, certain internal elements like printed circuit boards (PCBs) and the battery, left flipper, left wheels, and left track removed.

FIG. 5 illustrates a top perspective view of the embodiment of FIG. 1, with the cover, antenna, certain internal elements like printed circuit boards (PCBs) and the battery, left flipper, left wheels, and left track removed. Cliff sensors 120, 128 and cliff sensor PCBs 320, 348 can be seen at a front of the housing 102. Behind the cliff sensors 120,128 is a casing 310 for two front wheel drive motors. The casing 310 also supports gear 326A of each of the drive gear assemblies 326 (comprising drive gears 326A-326D) for a front wheel. Various embodiments of the present teachings can include a right drive gear assembly and a left drive gear assembly. Each drive gear assembly 326 can be used to translate motor rotation to a respective front wheel 130 with proper speed reduction, as would be understood by those skilled in the art.

Figure 10:
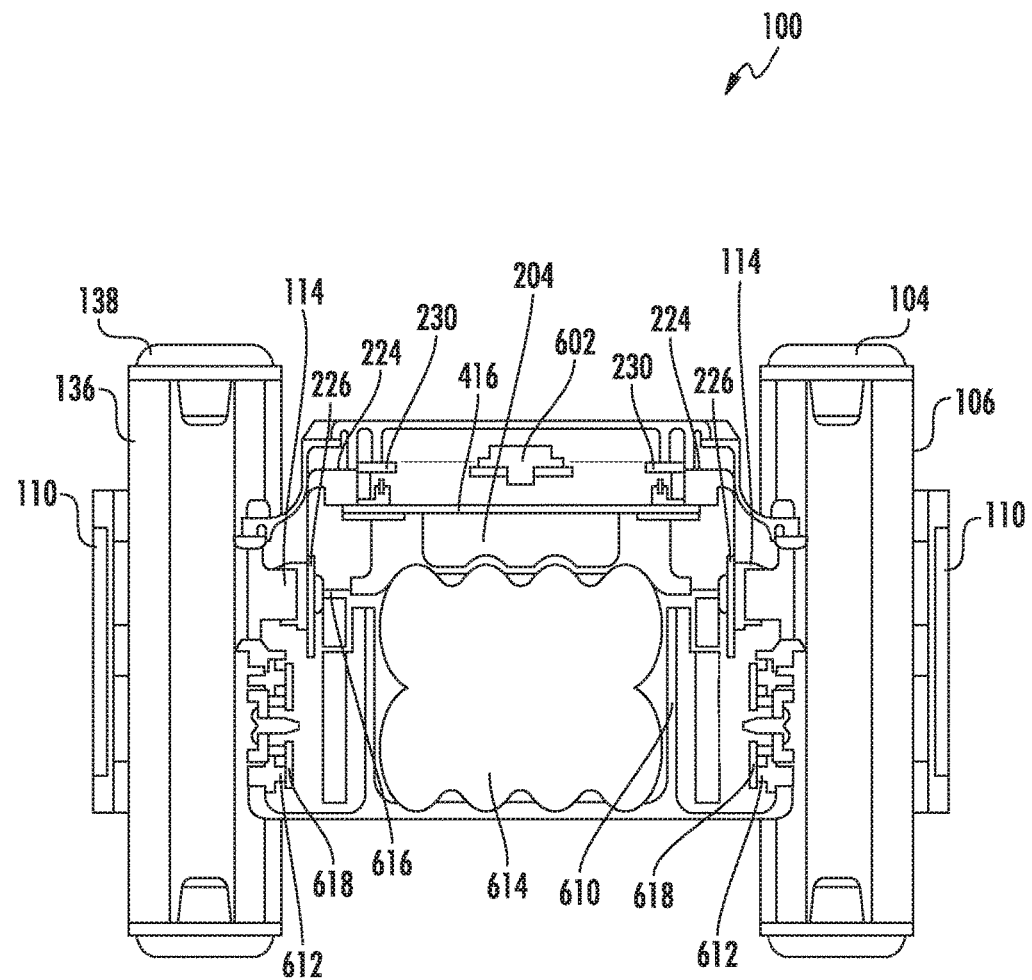
FIG. 10 is a cross sectional view of the robot of FIG. 1, taken through the side cameras and looking toward a rear of the robot.

Behind the front wheel drive motor casing 310 is a contoured portion 344 of the housing bottom that can be used to support a battery (such as battery 614 in FIG. 10). In an embodiment, the contours 344 can be arranged to accommodate an 8-cell battery having four cells supported by a bottom of the housing 350. One skilled in the art will understand, however, that the bottom of the housing 350 need not be contoured to the battery, or can be contoured to accommodate other battery shapes. The contours 344 can assist in dissipating heat from the battery, because the contours increase a surface area of the housing that can be used for heat dissipation. A wall (610 in FIG. 10) on either side of the contoured bottom portion of the housing can optionally be provided to hold the battery securely in the housing.

On an outside of each battery-securing wall 610 are the camera, IR LEDs, and wall-following sensors 308. The housing 102 can protrude along the side to provide space for side-located cameras, IR LEDs, wall-following sensors 308, and their PCBs 328. The housing protrusion preferably can fit within a cavity bounded by the wheels 106, 118, 130, and 136 to the front and rear (that is, by wheels 106 and 118 on one side of the robot, and by wheels 130 and 136 on another side of the robot), by the track 138 on the top and bottom, and/or by a flipper (when in its stowed position) on the outside. For impact protection, the protrusion can be sufficiently low-profile to be protected at least in part by the wheels, track, and flipper if the robot is thrown or dropped.

Figure 7:
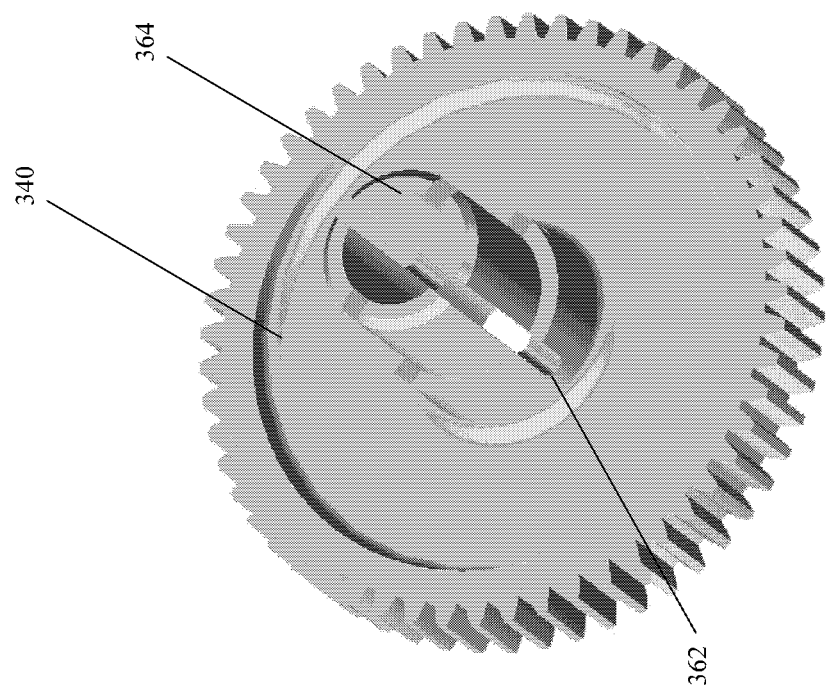
FIG. 7 illustrates the flipper clutch gear of FIG. 6.
Figure 6:
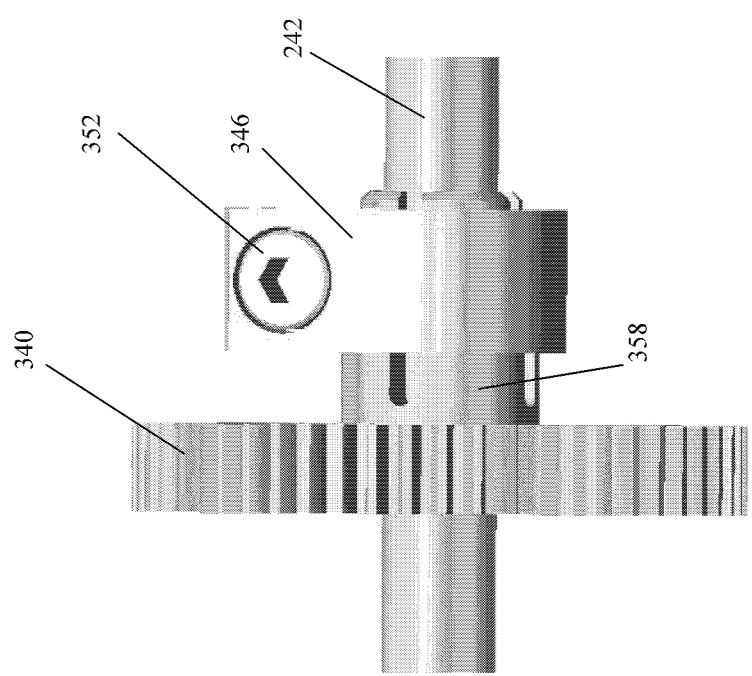
FIG. 6 illustrates an embodiment of a flipper clutch for a robot in accordance with the present teachings.

Behind the contoured bottom portion 344 of the housing is a flipper motor 338 attached by a small gear 306 to a flipper drive gear 340. The flipper drive gear 340 can include a friction-based slip clutch as described hereinbelow. Referring to FIGS. 6 and 7, in certain embodiments of the present teachings, the flipper drive gear 340 includes a slotted cylindrical protrusion 358 (comprising protrusions 364 and slots 362) that surrounds the rear axle 242. The slotted cylindrical protrusion 358 can be surrounded by a collar 346 that can be tightened by tightener 352 to compress the slotted cylindrical protrusion 358 to clamp the gear 340 to the rear axle 242, for example, at a predetermined torque corresponding to a slip torque. The slots in the protrusion 358 can facilitate clamping by the collar, because they allow the protrusion 358 to shrink around the axle 242. The flipper drive gear 340 can comprise, for example, brass or another suitably strong material such as certain metals, plastics, or composites.

In the illustrated exemplary embodiment of FIG. 5, on a side of the rear axle 302 opposite the flipper drive gear 340 is a side-of-shaft magnetic encoder 336 to track a rotational position of the flipper 110. The magnetic encoder 336 can be connected to a sensor, for example, on flipper board (PCB) 202 (see FIG. 2). For simplicity and space savings, the respective sensors for the flipper position magnetic encoder 336 and an odometry magnetic encoder 350 can be located, for example, adjacent to associated encoders on the flipper board 202 and the mobility board 218, respectively. Rear axle 242 can also comprise an offset flat surface 304, which can engage with flippers 110 to rotate the flippers about the rear axle 242.

FIG. 8 is a cross sectional view of the robot of FIG. 1, taken through the front axle drive gear 326B and looking toward a front of the robot. Application board 416 is disposed within housing 102 above mobility board 218. Front camera PCB 418 is disposed within housing 102 forward of the application board 416. The front cliff detector PCBs 320, 348 can also be seen disposed forward of the application board 416 within housing 420.

Figure 9:
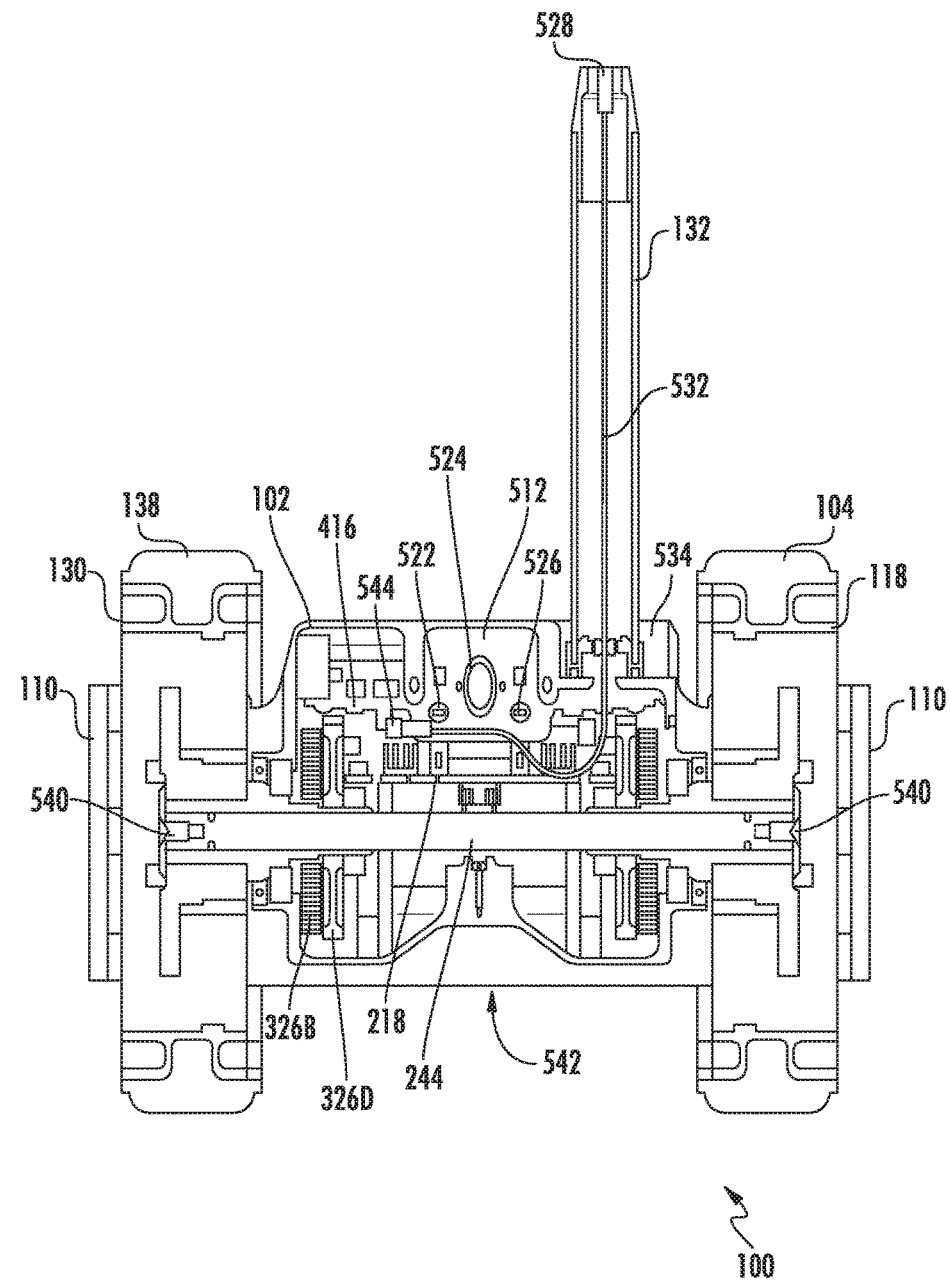
FIG. 9 is a cross sectional view of the robot of FIG. 1, taken through the front axle and looking toward a rear of the robot.

FIG. 9 is a cross sectional view of the robot embodiment of FIG. 1, taken through the front axle 244 and looking toward a rear of the robot. The rear camera 524, camera PCB 512, and IR LEDs 522, 526 are disposed within housing 102 rearward of the mobility board 218 and the application board 416, which are illustrated in cross section. The front axle 244, the drive gears 326B and 326D, the front wheels 118, 130, tracks 104, 138, and fasteners 540 can be seen in cross section. The fasteners 540 couple the wheels 118, 130 to the front axle 244. In the illustrated exemplary embodiment, a bottom surface of the housing raises up in the center 542 under the front axle. The antenna mast 132 and its radio frequency (RF) connector 528 can be seen in cross section, along with the RF cable 532 and its connector 544. The RF cable 532 connects the antenna (not illustrated) to the radio. An example of the radio 924 is illustrated in FIG. 9. In the illustrated embodiment, the antenna mast 132 is mounted in a recessed area 534 of the top surface of the housing 102. This can protect the mounting area of the antenna mast 132 from impacts to a top surface of the robot. The mounting area may be less pliable than the mast and therefore more likely to be damaged upon impact because it cannot bend to absorb forces. If, for example, the robot rolls over, the antenna mast 132 can bend and the recessed area 534 can substantially protected the antenna mount from direct impact forces due to its placement in the recess. One skilled in the art will understand that the antenna mast 132 need not be mounted in a recessed area of the housing and can be mounted to a top surface of the housing, within the housing and protruding through an aperture in a top surface of the housing, etc.

FIG. 10 is a cross sectional view of the robot of FIG. 1, taken through the side cameras 114 and looking toward a rear of the robot. The cameras 114, camera PCBs 226, wall-following sensors 612, and wall-following sensor PCBs 618 can be seen in cross section on each side of the robot. In certain embodiments of the present teachings, the wall-following sensor PCBs 618 will be connected to mobility board 218. The camera PCBs 226 can be connected to the application PCB 416 via, for example, flexible cables 224 extending from the camera PCBs 226 on each side of the robot to connectors 230 that are connected to the centrally-located application board 416. The battery cover 204 can be seen in cross section under the application board 416, and a cross section of a sound exciter 602 can be seen above the application board. Battery 614 can be provided below and in contact with battery cover 204. Battery cover 204 can be made of an appropriate heat conducting material to conduct heat away from battery 614, and additionally can be made of a material that can withstand the heat produced by the battery and the robot in a variety of environmental conditions and for a variety of tasks. In addition, battery cover 204 can include contouring or other shaping to accommodate battery 614 to increase the surface area of contact between the battery 614 and battery cover 204, to better conduct heat from the battery 614. The present teachings contemplate utilizing a variety of rechargeable and non-rechargeable power sources in addition to, or instead of, the illustrated battery 614.

Various embodiments of robot 100 in accordance with the present teachings can produce sound. Sound can be produced in a number of ways, for example using a conventional small speaker or by the illustrated sound exciter 602. Sound exciter 602 can turn virtually any solid object into a speaker by vibrating it at speeds of up to 20,000 cycles per second (Hz). The solid object preferably has a large, flat surface area. In the illustrated embodiment, a payload expansion port cover (such as cover 140) can serve as the surface vibrated by the sound exciter 602 to produce sound. However, if the payload expansion port cover is removed to allow attachment of a payload, another suitable surface can be provided for vibration by the sound exciter 602. A sound exciter can use less energy than a conventional speaker to produce a suitable sound.

Figure 11:
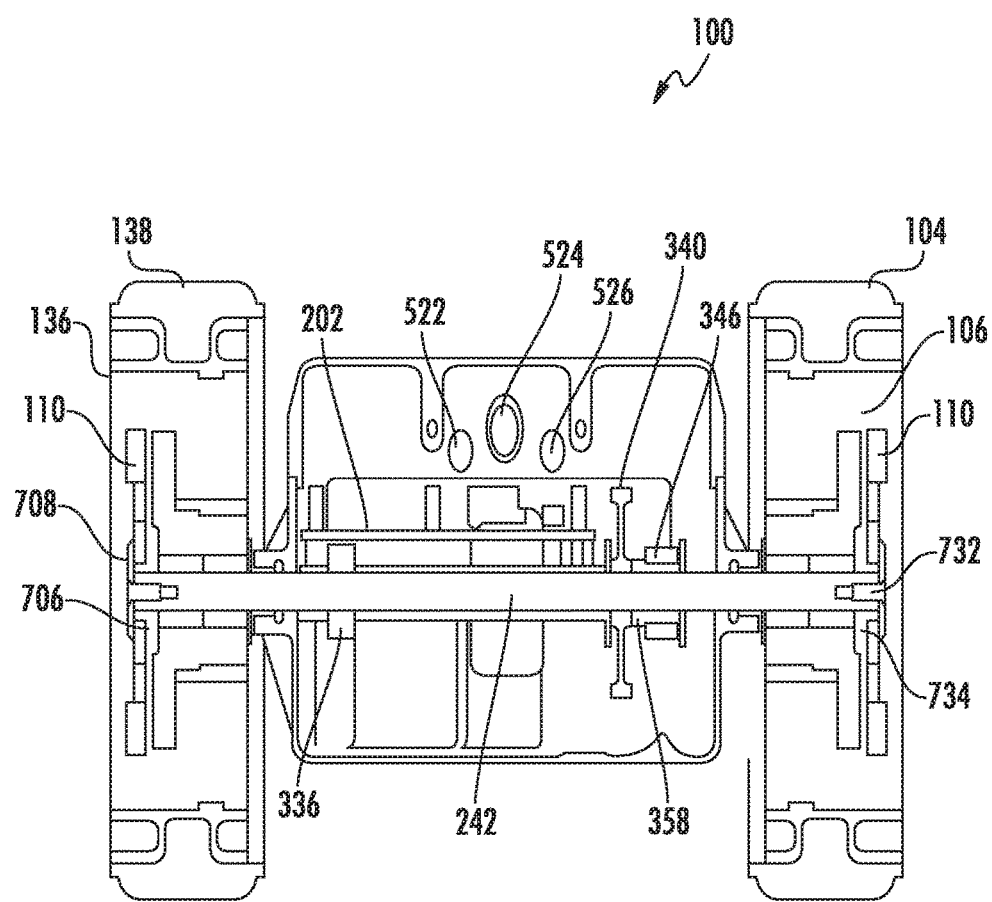
FIG. 11 is a cross sectional view of the robot of FIG. 1, taken through the rear axle and looking toward a rear of the robot.

FIG. 11 is a cross sectional view of the robot of FIG. 1, taken through the rear axle 242 and looking toward a rear of the robot. A cross section of the rear axle 242, tracks 104, 138, rear wheels 106, 136, and flippers 110 can be seen, as well as inserts 706, 734 and fasteners 708, 732 (which can be the same as fasteners 540 shown in FIG. 9), which couple the wheels and flippers to the rear axle 242. In certain embodiments, the rear axle 242 does not drive the rear wheels 106, 136 and thus the rear wheels can be free to rotate about the rear axle 242. However, the rear axle 242 can drive the flippers 110. The flippers 110 can be driven, for example, by engagement of a small offset flat surface 304 on each end of the rear axle 242 engaging a complementary offset flat surface on an insert 706, 734 that attaches to each flipper base in a manner set forth in the disclosure of U.S. patent application Ser. No. 13/340,957, filed Dec. 30, 2011, for Resilient Wheel Assemblies, which is incorporated by reference herein in its entirety.

Magnetic encoder 336 tracks a rotational position of the flippers 110, and is illustrated proximate to the flipper board 202. In addition, the flipper drive gear 340 and its cylindrical protrusion 358 can be seen in cross section, along with the collar 346 that can be used to tighten the cylindrical protrusion 358, and therefore the flipper drive gear 340, to the rear axle 242.

Figure 12:
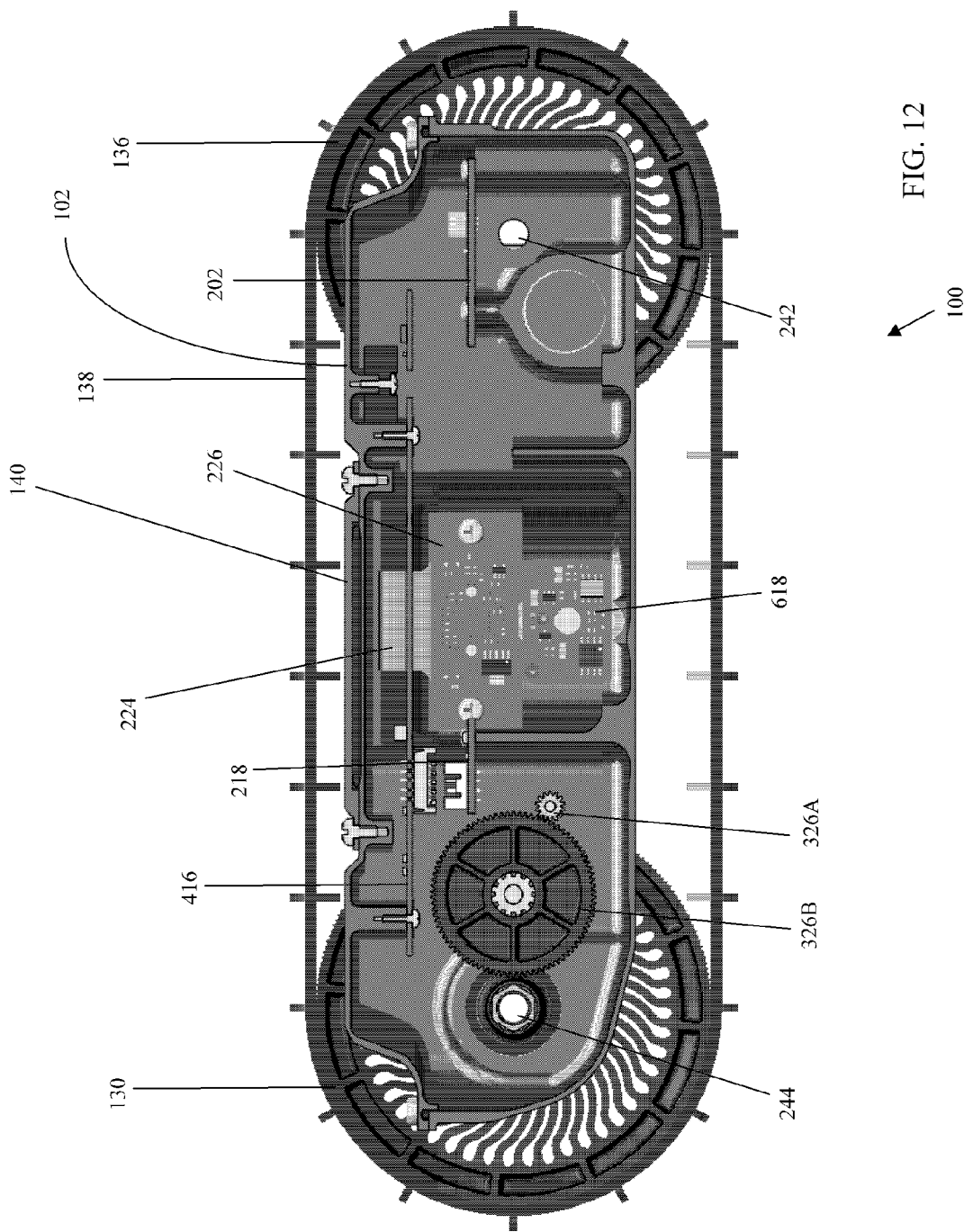
FIG. 12 is a cross sectional view of the robot of FIG. 1, taken through a portion of the right-side drive gear assembly and looking toward a right side of the robot.

FIG. 12 is a cross sectional view of the robot of FIG. 1, taken through a portion of a right-side drive gear assembly and looking toward a right side of the robot. The rear axle 242, the front axle 244 and two of the front wheel drive gears 326A and 326B can be seen. In addition, the flipper board 202, the mobility board 218 and the application board 416 can be seen in cross section. The payload expansion port cover 140 at the top of the robot housing 102 can also be seen in cross section. A side camera PCB 226 and a wall-following sensor PCB 618 can be seen, along with a flexible cable 224 connecting at least the camera PCB 226 to the application board 416.

Figure 13:
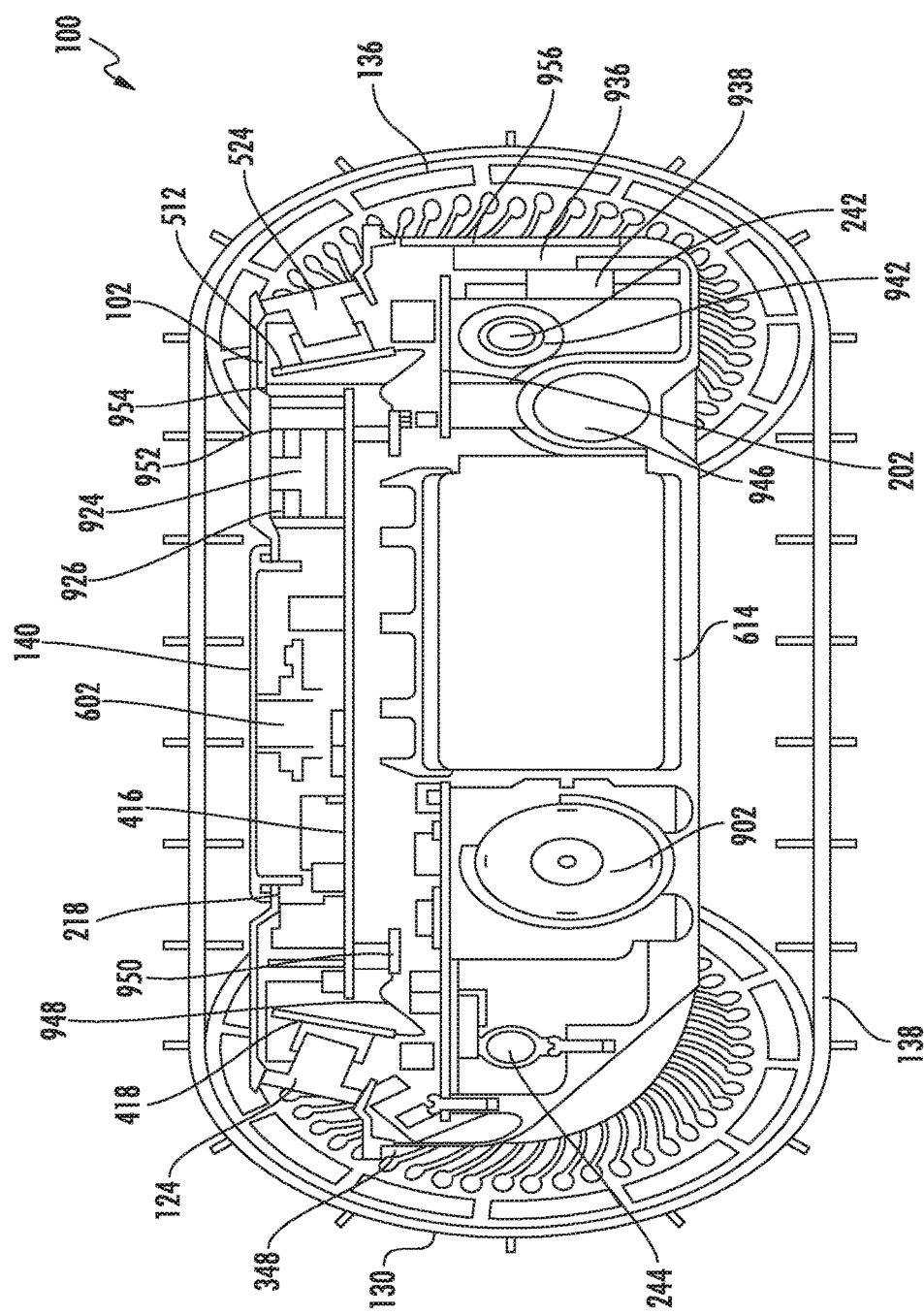
FIG. 13 is a cross sectional view of the robot of FIG. 1, taken midway through the robot and looking toward a right side of the robot.

FIG. 13 is a cross sectional view of the robot of FIG. 1, taken midway through the robot and looking toward a right side of the robot. A drive motor 902 for the right front wheel 130 can be seen in a location forward of the battery 614. The flipper drive motor 946, flipper board 202, rear axle 242, and rear camera 524 can be seen in cross section at a location rearward of the battery 614. It can be seen by comparing the side cameras 114 illustrated in FIG. 10 to the front and rear cameras 124, 524 illustrated in FIG. 13, that the angles of the front and rear cameras in the illustrated embodiment are aimed higher than the side cameras. For example, as illustrated in FIG. 10, side cameras 114 can be aimed substantially parallel to, for example, the front and rear axles. By comparison, front and rear cameras 124, 524 can be aimed above a plane described by the front and rear axles. Exemplary connections of the front camera 124 and rear camera 524 to the application board 416 (e.g., via a flexible cables 948, 954 and connectors 950, 952) are shown below a forward and a rearward end of the application board.

In the illustrated embodiment, a power ON/OFF switch 938 can be provided rearward of the rear axle 940, along with a charge port 936 and charge portion PCB assembly 956. One skilled in the art will understand that the charge port 936 and power switch 938 can be located in other locations on the remote vehicle. In the illustrated exemplary embodiment, a radio 924 is provided above the application board 416 between the rear camera 524 and the sound exciter 602. In the illustrated embodiment, the radio 924 is mounted to the housing 102 via thermal pads 926 that can conduct heat from the radio 924 to the housing 102 to help dissipate heat produced by the radio during operation. Forward of the radio is the sound exciter 602, which is located directly under the payload expansion port cover and exciter surface 140. The payload expansion port cover 140 can be vibrated by sound exciter 602 to produce sound.

The radio 924 can be, for example, an 802.11 family digital radio, with 100 mW transmit power, operating on 2.4 or 4.9 GHz. 802.11 family digital radios include digital radios that can operate in a variety of frequency ranges, and in embodiments can be capable of maintaining bidirectional data connections to multiple peers at the same time. In embodiments, the robot 900 can establish and maintain connections up to 6 Mbps through radio 924. The radio is connected in a known manner with the antenna discussed hereinabove.

Figure 14:
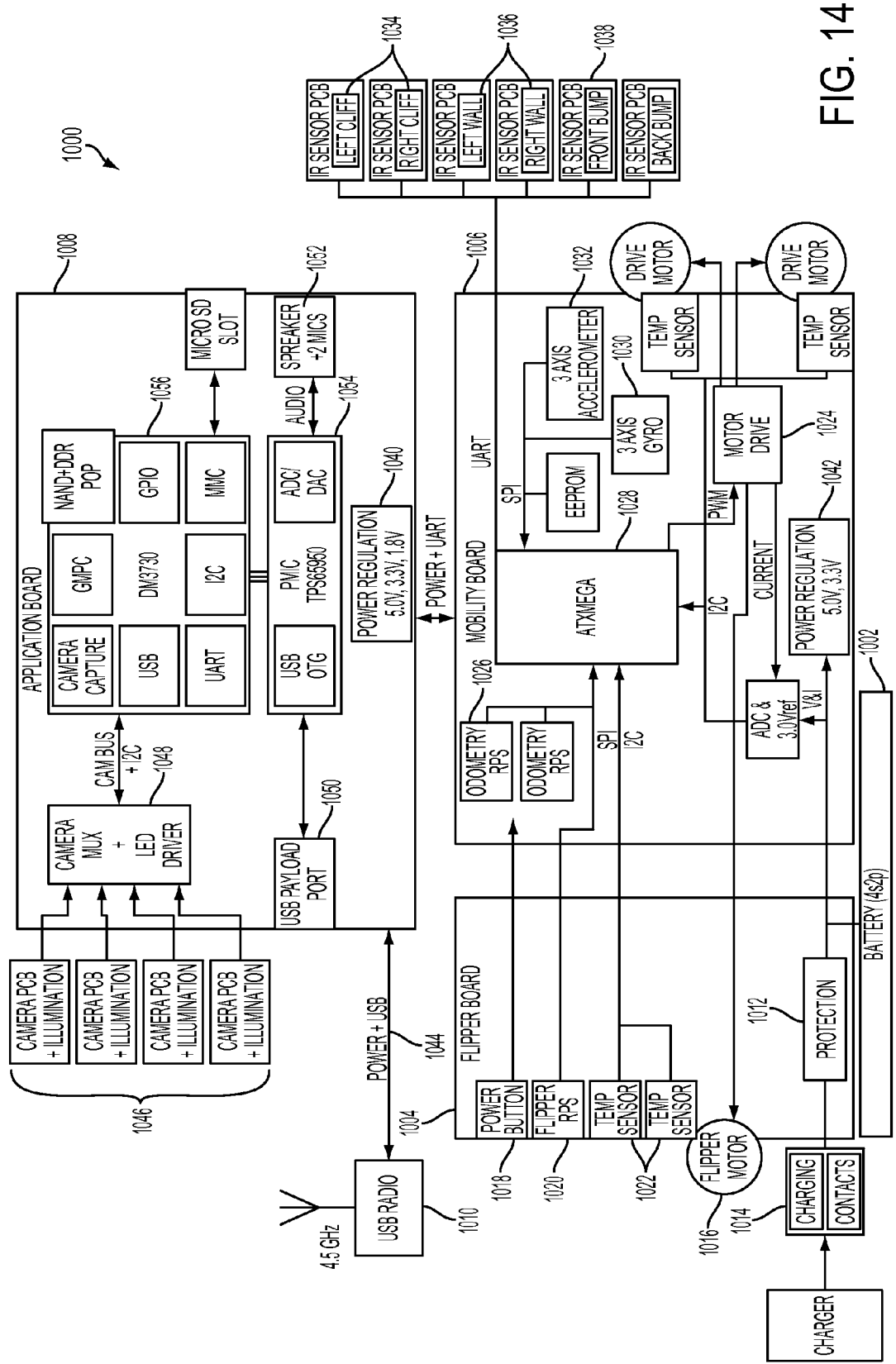
FIG. 14 is an exemplary robot system diagram.

FIG. 14 is a schematic diagram of an exemplary embodiment of a robot system 1000 in accordance with the present teachings. The battery 1002 is connected directly or indirectly to the flipper board 1004, the mobility board 1006, the application board 1008, and the radio 1010 to provide component power. A charge port 1012 is connected to charging contacts 1014 on the flipper board 1004. The flipper motor 1016 is connected to the flipper board 1004, as is the power button 1018, temperature sensors 1022, and a flipper position sensor 1020 that reads a magnetic flipper position encoder such as, for example, magnetic flipper position encoder 704 or 942. On the mobility board 1006, the motor driver 1024 can send a signal via the flipper board 1004 to the flipper motor 1016 to drive the flipper motor 1016.

The mobility board 1006 can also comprise one or more odometry position sensors 1026 that read a magnetic odometry encoder, and a microcontroller 1028 such as, for example, a ATXMEGA microcontroller or similar microcontroller or microprocessor to control operations of the robot system. Inputs to the microcontroller 1028 can include a flipper position from flipper position sensor 1020, temperature information from temperature sensors 1022 (e.g., temperature of the housing, each drive motor, and the flipper motor), power level information from battery 1002, and information from such sensors as a gyro 1030 and an accelerometer 1032. The microprocessor 1028 can also receive data from cliff sensors 1034 and wall following sensors 1036 (e.g., via a universal asynchronous universal transmitter (UART)). The microprocessor 1028 can be coupled with a memory device, such as an EEPROM or other similar memory device, to store data and/or machine-readable instructions for retrieval and execution by microprocessor 1028. In the illustrated embodiment, a front bump sensor 1038 can also be included to provide information to microcontroller 1028. Power can be provided to mobility board 1006 from battery 1002 through appropriate power connections, and the power can be routed through power regulator 1042 for voltage regulation.

The mobility board 1006 is connected to the application board 1008 and can send power and data thereto through appropriate power and data connections. Power sent to the application board 1008 can pass through a power regulator 1040. A power and USB connection 1044 is provided between the radio 1010 and the application board 1008. Cameras 1046 (e.g., a front camera, rear camera, left side camera, and right side camera) can also be connected to the application board 1008. Cameras 1046 can be, for example, connected to the application board 1008 via a camera multiplexer (MUX) and LED driver 1048, which can also drive illumination provided for the cameras.

The application board 1008 can also include a USB payload port 1050 that can be located under a payload expansion port cover such as the payload expansion port cover 140 illustrated in FIGS. 1 and 12. The payload port 1050 and a sound exciter 1052 can connect to a power management integrated circuit 1054, such as the illustrated PMIC circuit. In an alternative embodiment, instead of sound exciter 1052, the robot can comprise an audio system of one or more speakers and one or more microphones in position 1052. The illustrated application board 1008 also includes a processor 1056 such as the illustrated digital media processor, for example the illustrated DM3730, including camera capture, memory such as NAND+DDR PoP, connection for an SD memory card, etc. It will be appreciated that any appropriate processor can be used in the place of processor 1056.

FIGS. 15A and 15B provide two exemplary communication PCB diagrams for PCBs that may be used in connection with the embodiments of the present teachings, illustrating two PCBs for the communications module/card to support multiple radio options. A communication PCB illustrated in FIG. 15A comprises USB port 1102, PCI-USB bridge 1104, PCI port 1106, and radio 1108. USB port 1102 enables a connection with, for example, the application board. Bridge 1104 enables translation between communication formats, for example between PCI and USB formats. PCI port 1106 communicates with radio 1108, which can be any appropriate radio to enable wireless communication, for example, a Ubiquity XR4 radio. In contrast with FIG. 15A, a communication PCB illustrated in FIG. 15B can utilize a USB connection between USB port 1110 and radio 1116, obviating a bridge or similar device to communicate with radio 1116.

The use of an additional PCB for radio communication is optional, and in embodiments a USB port can be employed on the application board, so that a separate communication PCB is not needed. If additional radio options are desired, the present teachings encompass utilizing the illustrated communication PCBs. Alternatively, or additionally, space can be reserved on the application board to accommodate a USB radio. In embodiments, space is provided on the application board for a relatively large USB radio (i.e., larger than a presently typical WiFi radio).

Figure 16:
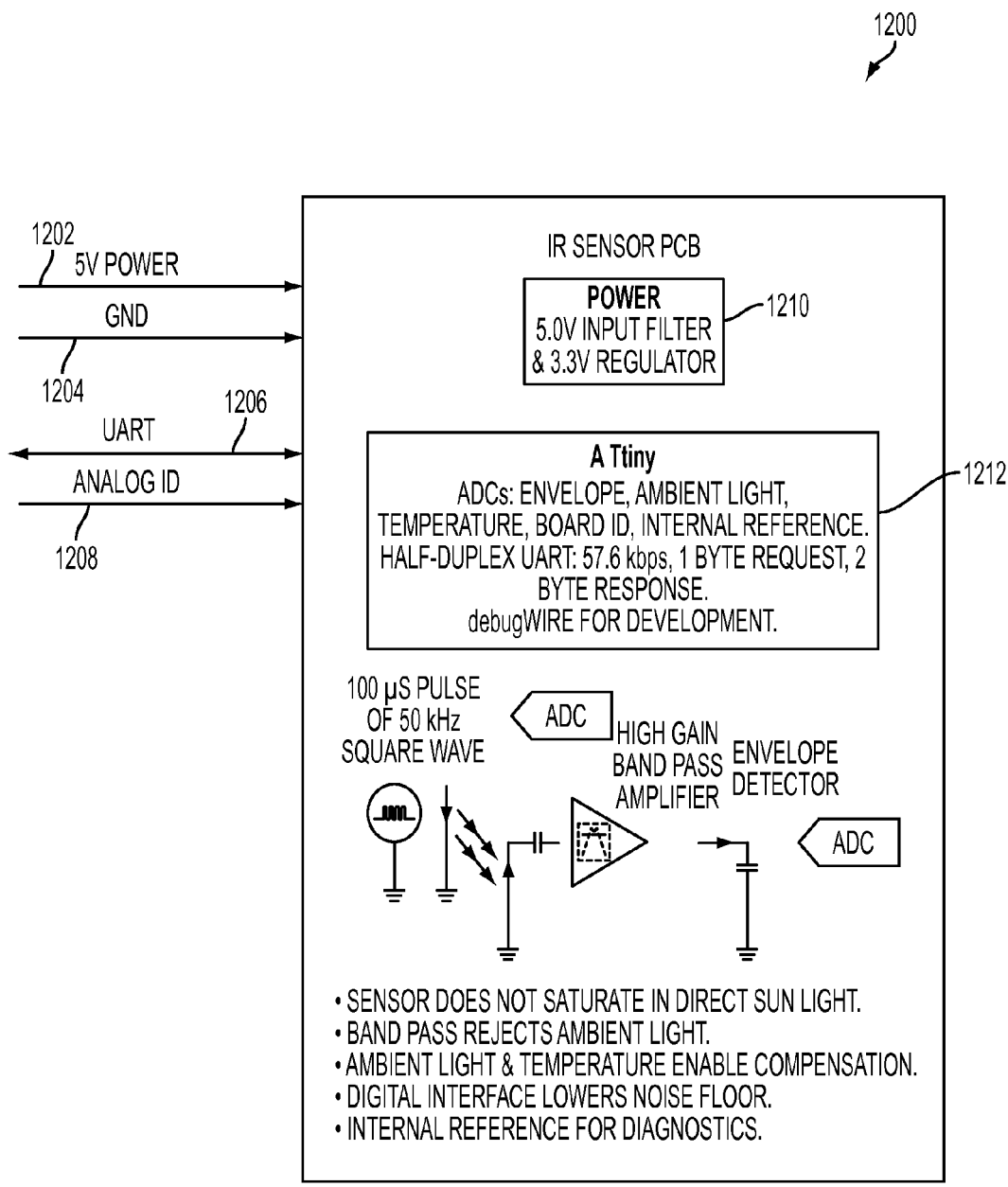
FIG. 16 is an exemplary infrared (IR) sensor diagram.

FIG. 16 illustrates a diagram of an exemplary infrared (IR) sensor PCB 1200 for wall-following sensors or cliff detection sensors (both of which are typically IR sensors). Analog data 1208 is received by the PCB and sent to, for example, a mobility board 1006 as illustrated in FIG. 10. Power 1202 is also received from a power supply, such as battery 1002 as illustrated in FIG. 14, through an appropriate connection also including a ground 1204. A power filter and regulator 1210 can be included on the PCB 1200, as well as a microcontroller 1212, to control the operation of IR illuminators and sensors. In the illustrated exemplary embodiment, the microcontroller 1212 includes an ATtiny microcontroller. IR sensor PDC 1200 can comprise one or more IR sensors and associated circuitry. In certain embodiment of the present teachings, an IR sensor does not saturate in direct sunlight when a band bass filter is utilized to reject ambient light, and further ambient light and temperature enable compensation, which may be performed by microcontroller 1212. Further, a digital filter such as a digital interface can be utilized to lower a noise floor. Thus, using the illustrated IR sensor PCB, the IR sensor PCB can provide a signal that is filtered to be substantially noise-free. An internal reference can also be included for diagnostic purposes. In various embodiments, an analog signal processor is also provided in communication with the microcontroller. In various embodiments, for cliff sensing and wall following, 2 LEDs operate in a known manner at a modulation rate to sense an object.

Figure 17:
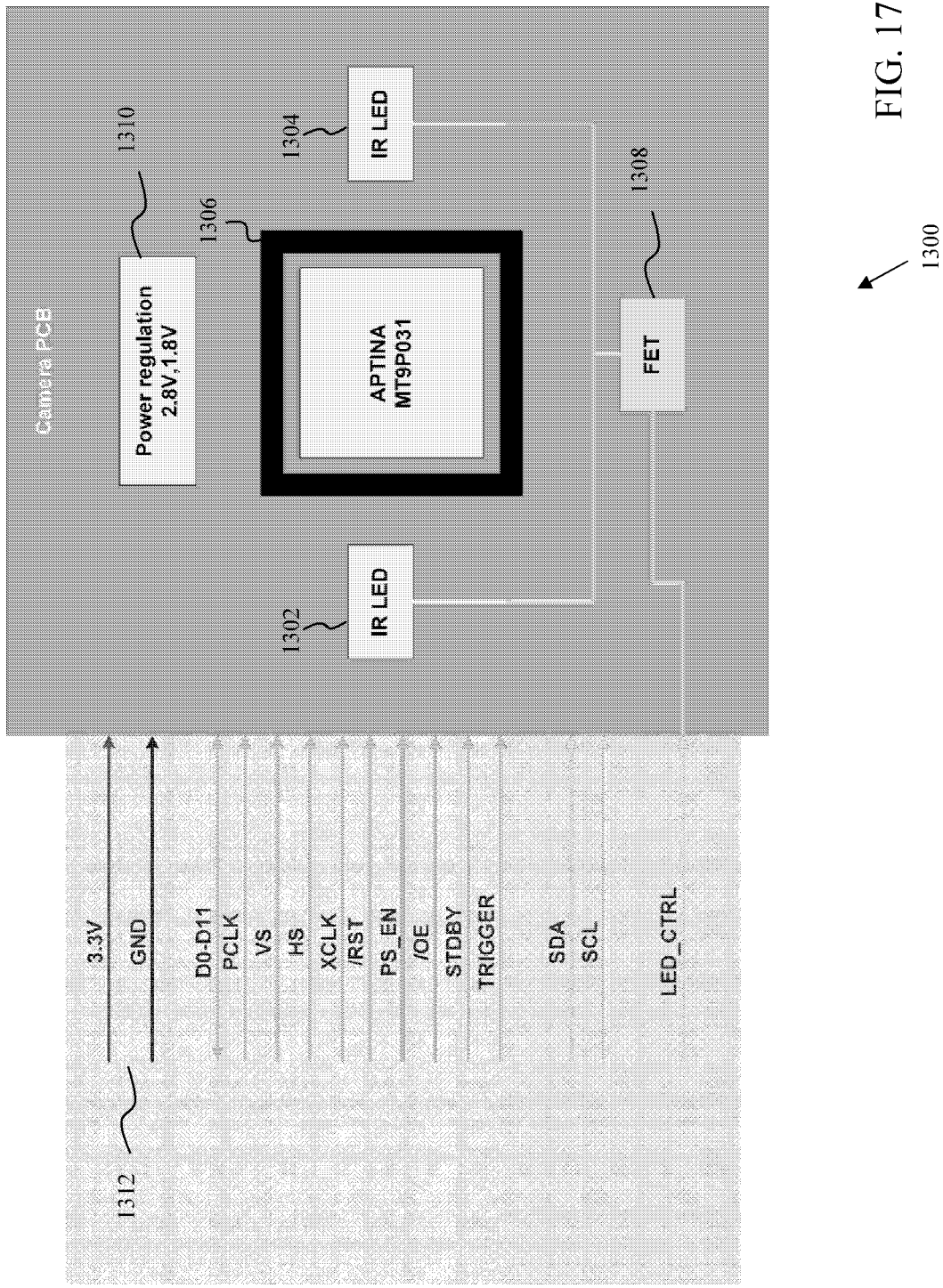
FIG. 17 is an exemplary camera PCB diagram.

FIG. 17 is a diagram of an exemplary camera PCB 1300. Two IR LEDs 1302, 1304 are illustrated on either side of digital image sensor 1306, in communication with a field-effect transistor (FET) 1308. A digital image sensor 1306 is also provided on the PCB, for example an APTINA CMOS digital image sensor. Power regulation 1310 can regulate voltage provided to the PCB via power supply 1312, which can be provided through an appropriate power connection, including a ground. In embodiments, the camera PCB 1300 can receive power and ground from the application board and can send image data to the application board. The camera PCB can also receive LED and a variety of other control signals from the application board and other information, as illustrated.

Figure 18:
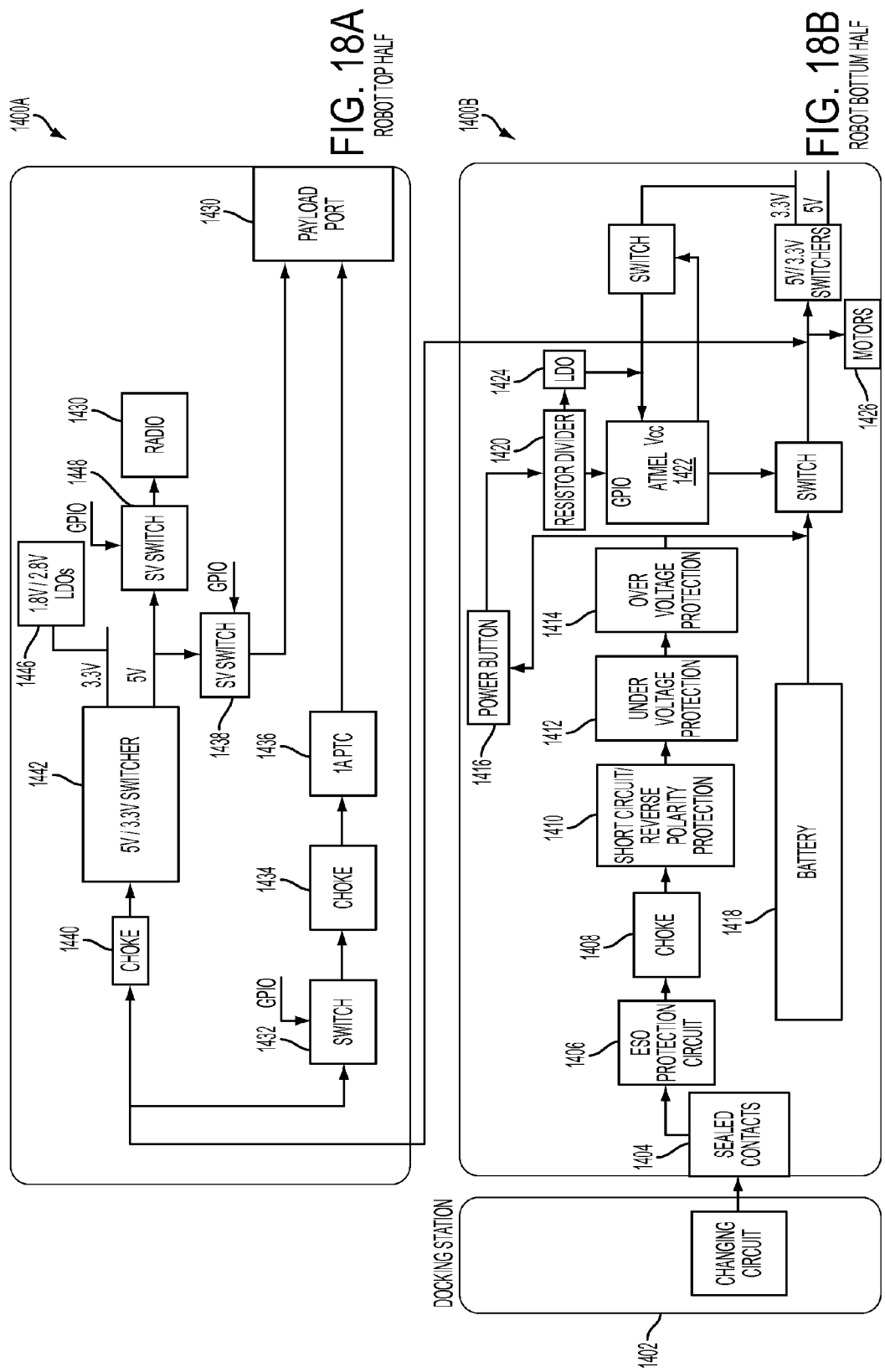
FIGS. 18A-18B illustrate an exemplary power system diagram.

FIGS. 18A and 18B illustrate an exemplary power system that shows the top half 1400A and bottom half 1400B of a robot system. A docking station 1402 is shown with a charging circuit and an engagement path to sealed contacts 1404 on the robot bottom half 1400B. Power from the charging circuit of the docking station 1402 can pass through an electrostatic discharge diode (ESD) protection circuit 1406, a choke 1408, a short circuit/reverse polarity protection 1410, an under voltage protection 1412, and an over voltage protection 1414, to charge the battery 1418. A power button 1416 can also be connected to the battery 1418 to send power to a resistor divider 1420 that divides power between a microcontroller 1422 (which can be, e.g., an ATMEL microcontroller or other appropriate microprocessor or microcontroller) and a low-dropout regulator (LDO) 1424 that also channels power to the microcontroller 1422. The microcontroller 1422 controls the illustrated motors 1426 (e.g., the flipper motor and the front wheel drive motors).

The illustrated robot top half 1400A comprises a radio 1450 and a payload port 1430, as well as the supporting switches 1432,1438, 1442, 1448, chokes 1434, 1440, voltage regulators (LDOs) (such as LDO 1446), and resistors (such as thermistor 1436), which can communicate with the robot bottom half 1400B by appropriate connectors 1428.

Figure 19:
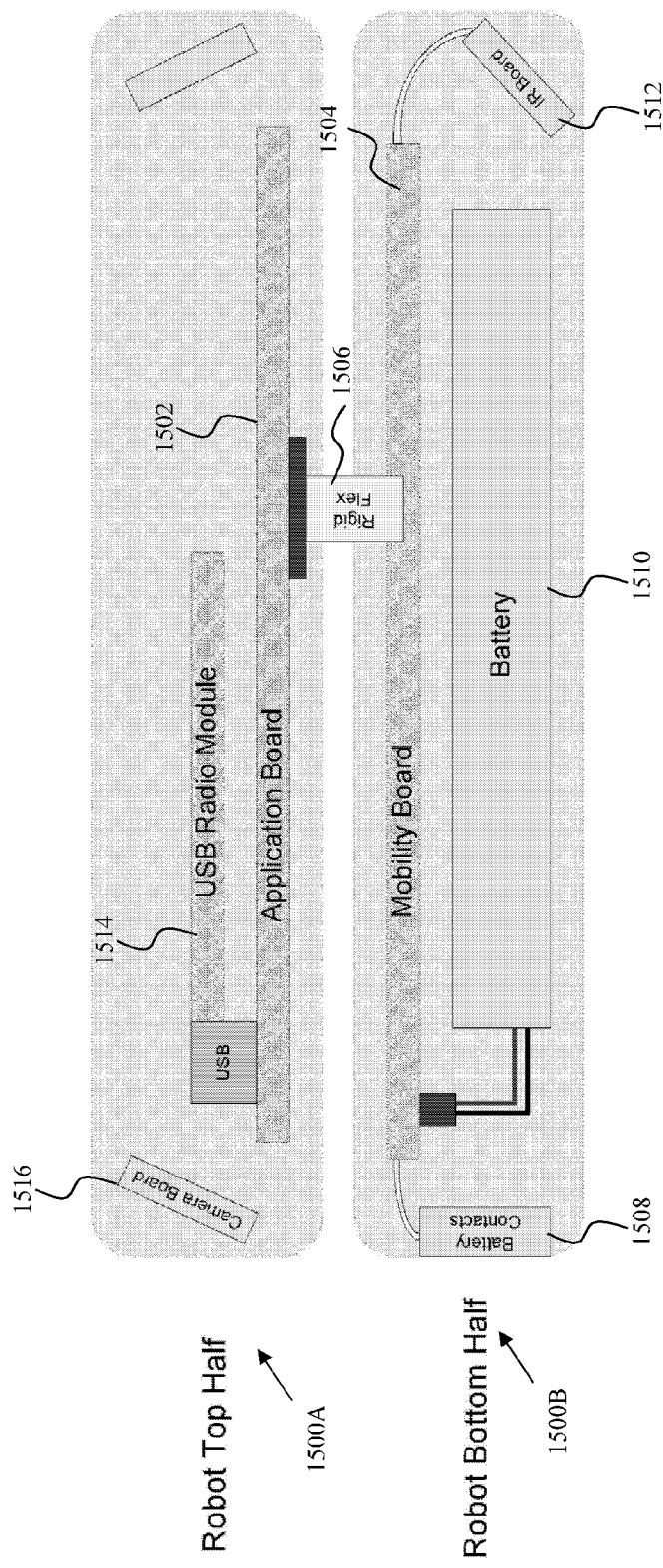
FIG. 19 illustrates an exemplary interconnection of robot PCBs.

FIG. 19 illustrates an exemplary interconnection of robot PCBs such as application board 1502 and mobility board 1504, dividing the top half 1500A and the bottom half 1500B of the robot for illustrative purposes. The robot bottom half 1500B includes battery contacts 1508 and a battery 1510 connected to the mobility board 1504 and to one or more IR boards 1512 (e.g., boards for the wall-following and cliff detection IR sensors). A rigid flex connector 1506 connects the mobility board 1504 to the application board 1502. An example of a rigid flex connector 1506 is flexible cable 224 illustrated in FIG. 2. The application board 1502 is connected to the radio 1514 through, for example, a USB connection, and can also be connected to the camera boards illustrated in the top half 1500A.

Regarding the relative robot and antenna sizes, from experimentation (or calculation), a necessary antenna height can be determined that will prevent excessive signal loss, such as Fresnel loss, at a desired maximum operational distance. In embodiments, an antenna height can be determined to maximize a first, second, etc. Fresnel zone determined from the radiation of signals from the antenna, to minimize the effect of out-of-phase signals and other obstacles which may reduce received signal strength of signals from the robot. Additionally, given the determined antenna height, the robot should be sized to provide a sufficient base for the antenna relative to its size and weight. A secondary and optional consideration regarding relative robot size is that the robot should be large enough to allow the antenna to fold flat, for example diagonally, across a top surface of the robot, so that it can be conveniently and safely stowed. A longer antenna might require an alternative configuration either to wrap around the body, or have a design such as a z-fold or a more complex design to permit the mast to collapse or fold for stowing, yet stand up during routine operation. In addition, the robot must include a battery large enough to support the power draw of the radio over the entire mission duration along with the expected robot driving profile. The battery size and weight can add to the size and weight of the robot.

In certain embodiments of the present teachings, sufficient room is provided for the antenna to fold over and fit within a gap or crush volume between a top surface of the tracks and a top surface of the housing, the gap or crush volume being bounded by a plane across the top of the tracks and the top surface of the housing. Certain embodiments may not provide enough room for the antenna to fold over and fit inside the crush volume (i.e., the gap) which can be expected from a 15 ft drop of the robot (which volume may be reduced by compression of the wheels, tracks, and other components upon impact), and depending on how the antenna is folded, the antenna components could be subject to damage from pinching or impact from a sufficiently long fall. Accordingly, the present teachings contemplate embodiments providing enough room for the antenna to fold over and fit inside the gap between the top of the track and the top surface of the housing and be protected from damage which may result from a long fall.

In various embodiments of the present teachings, the height, length, depth a placement of the wheels, flippers, and tracks (e.g., where the tracks are the tallest feature on the robot other than the antenna) allows the robot to survive drops in random orientations from 5 meters onto concrete. To survive such drops the wheels are used as energy absorbers and thus all of the features on the robot housing (except for the bendable, resilient antenna) are recessed below the outline of the wheel, allowing space for the wheels to compress before the housing hits the ground.

An exemplary process for robot stair climbing using a remote vehicle such as a small unmanned ground vehicle is set forth in U.S. Patent Publication No. 2010/0139995, filed Dec. 9, 2008, titled Mobile Robotic Vehicle, the disclosure of which is incorporated herein by reference in its entirety. The disclosed climbing methodology in the '995 publication applies to a robot of the size and weight class defined herein on conventional stairs. Conventional stair are defined as having a riser height of about 7.5" to about 8.0".

Operator Control Unit

Embodiments of the present teachings also provide a rugged and water resistant operator control unit (OCU) that is preferably of a hand-held size and can optionally be worn on the user's wrist. Embodiments of the OCU should be daylight readable, preferably backlit for reading at night, and have a 200-meter radio range to the robot. In various embodiments, the OCU can be provided with an attachment device so that the OCU can be affixed to an operator's wrist or arm, and thus be "wearable". The OCU preferably does not require users to wear wires or other boxes, so that it is easy to put on and take off. Various embodiments of the OCU also include a suitable built-in radio for communication with one or more associated remote vehicles. The OCU preferably has a battery life that at least matches that of the robot(s) it is intended to control, for example about 8 hours.

The Exemplary illustrated OCU embodiment has a curved (recessed) back surface, which helps the OCU accommodate the curve of an operator's forearm when worn thereon. Elastic straps or other similar attachment devices can be used to allow attachment to the operator's arm or another object that operator may wish to attach the device to.

Electronically, various embodiments of the design can be built around a microcontroller such as Texas Instruments® OMAP 3530 or similar microcontroller core, which can include a Gumstix Overo Module or a custom PCB. In an embodiment, the OMAP can tie directly to the OCU's LCD and touch screen interface, and a USB port can be used to interface to the radio system. In certain embodiments, a spare USB port can be provided via a waterproof connector, so that the operator can attach, for example, a USB audio device, such as a headset, or can attach the OCU to a desktop computer to download recorded images or videos. Additionally, the internal battery can be charged, for example, via a separate waterproof connector, and a sealed power switch can complete the external interface of the OCU. The OCU's radio antenna preferably folds conveniently out of the way for storage, and can be flipped up when maximum range is needed.

Certain embodiments of the OCU can include four battery cells that are split into two separate strings, allowing them to fit into the mechanical structure of the OCU in such a way as to provide the forearm-complementing recess along the back of the OCU mentioned above.

The OCU includes an input device to receive input from an operator. In embodiments, the input device can be a joystick, keyboard, or other tactile input mechanism. In embodiments, the input device can be, for example, a touchscreen interface on a display of the OCU, such as an LCD panel. Combinations of the above are also possible. The present teachings contemplate employing two conceptual methods for driving the robot: (1) a "virtual thumbstick" conceptual method; and (2) a "click to drive" conceptual method. For the virtual thumbstick method, a cross-hair is drawn on the screen by an operator, and touching the screen in the vicinity of the cross-hair sends instructions to the robot to drive/turn appropriately. In the click-to-drive method, touching the video image causes the robot to drive toward the area selected in the image.

Figure 21:
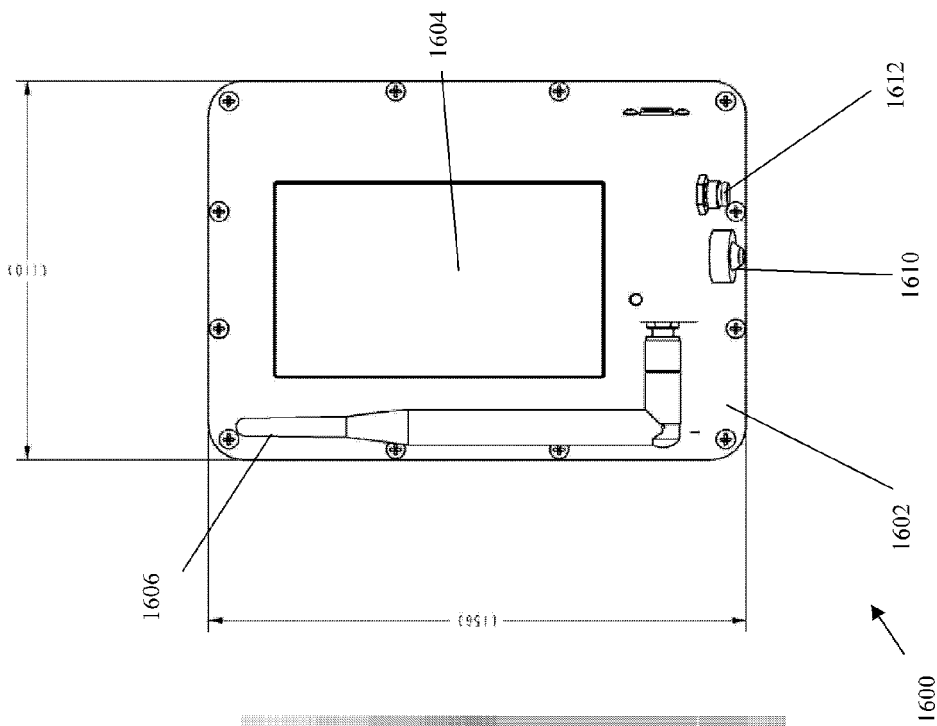
FIGS. 20-21 illustrate exemplary embodiments of a handheld controller for controlling a robot in accordance with the present teachings, including some exemplary measurements in millimeters.
Figure 20:
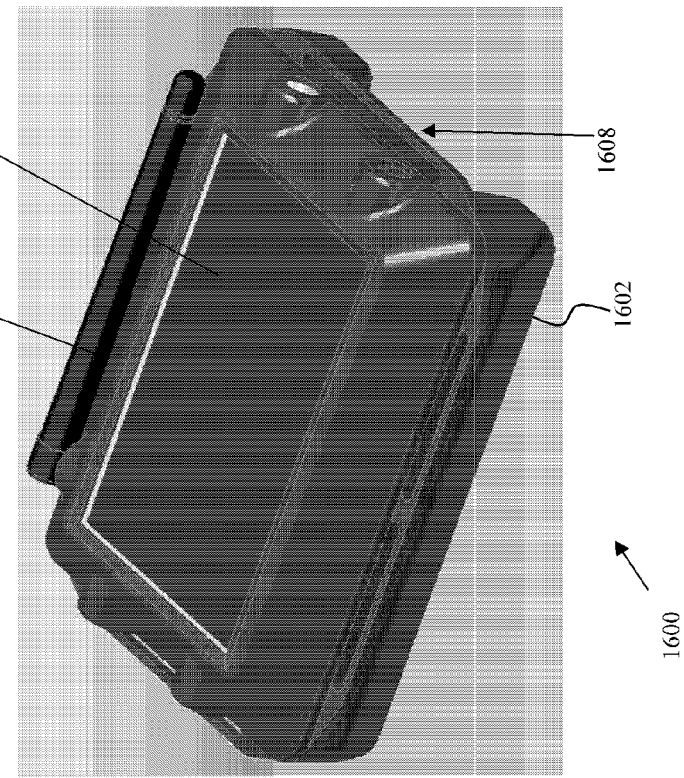

FIGS. 20 and 21 illustrate an exemplary embodiment of a handheld controller (OCU) for controlling a robot in accordance with the present teachings, FIG. 21 including some exemplary measurements in millimeters. The two figures illustrate slightly differing embodiments of the OCU. Housing 1602 supporting a display 1604 and a stowable antenna 1606 (illustrated in a stowed state). Housing 1602 also comprises a recess 1608, which can accommodate an operator's forearm to support the housing 1602 when worn on an operator's forearm. Housing 1602 can also comprise an attachment device, such as straps or other appropriate attachment (see, for example, FIGS. 27-31), to secure the housing 1602 to an operator's forearm or another object or surface. Display 1604 can comprise, for example, a liquid crystal display (LCD) screen (e.g., a WVGA 800×480 side LED backlit). A charge connector 1612 and a power button 1610 are also shown in FIG. 16B. In certain embodiments, the power button 1610 can be pressed to turn the OCU on, can be pressed briefly to put the OCU in a sleep mode, and can be pressed and held for a predetermined time (e.g., 4 seconds) to turn the OCU completely off. In an exemplary embodiment, embodiment, the OCU is 110 millimeters wide and 156 millimeters long.

Figure 23:
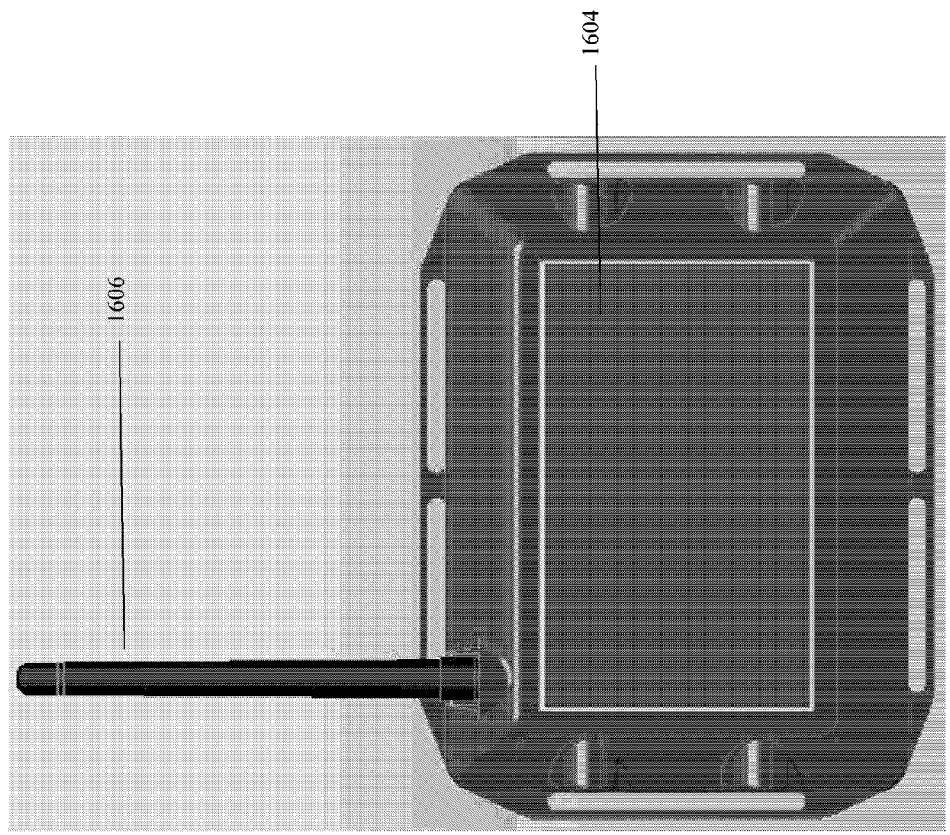
FIGS. 22-23 illustrate the handheld controllers of FIGS. 20-21 including an additional exemplary measurement in millimeters.
Figure 22:
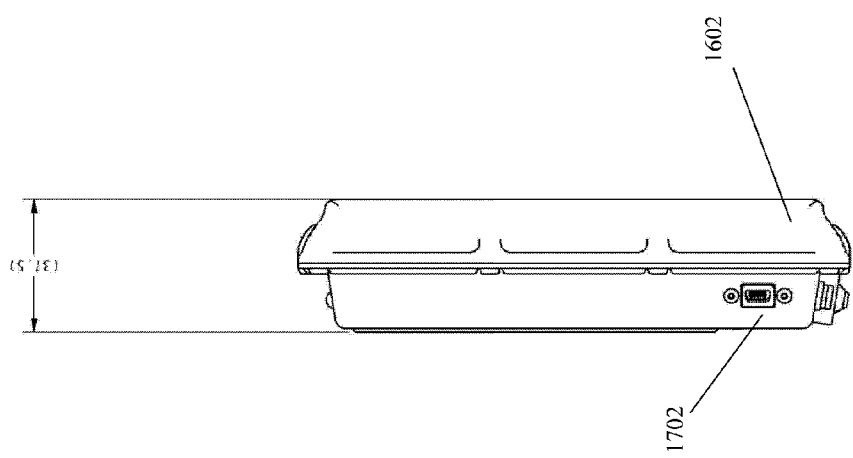

FIGS. 22 and 23 illustrate the handheld controllers of FIGS. 20 and 21, with FIG. 22 including an additional exemplary measurement in millimeters. A USB port 1702 is illustrated on housing 1602, to permit a data/power connection to another appropriate device. In FIG. 22, the exemplary OCU can have a thickness of 37.5 mm, however the thickness can vary in other embodiments of the OCU. Antenna 1606 is illustrated in a state deployed for operation to communicate with a robot system. Display 1604 can be, for example, a touch input device to provide commands to the OCU as well as to display information.

Figure 24:
FIG. 24 is a side view of the handheld controller of FIG. 20.

FIG. 24 is a side view of the handheld controller of FIG. 20. FIG. 24 illustrates recess 1802 to accommodate, for example, a user's forearm when the OCU is worn thereon. Antenna 1606 is illustrated end-on in a stowed position.

Figure 25:
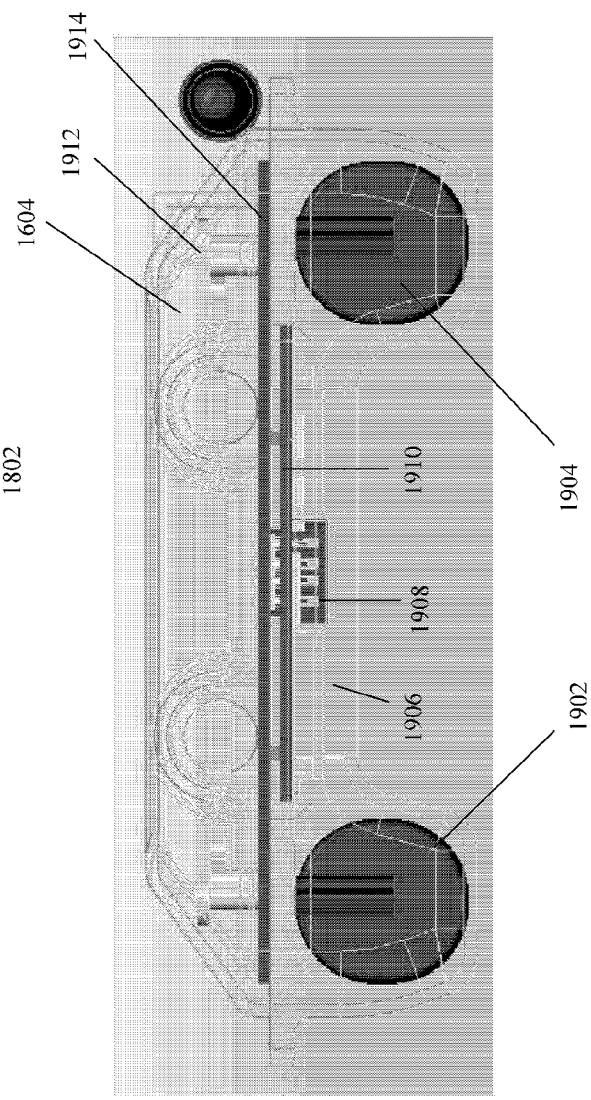
FIG. 25 is a side view of the handheld controller of FIG. 20, with the case being transparent.

FIG. 25 is a side view of the handheld controller of FIG. 20, with the housing illustrated as transparent to permit a view of internal components of the OCU. Battery units 1902, 1904 can be accommodated in portions of the OCU housing which protrude in a rearward direction of the OCU housing. In embodiments, the housing can be molded to provide portions which can accommodate batteries and which are formed to sides of the recess 1802. When two battery compartments are so provided, the weight of the battery units 1902, 1904 can be distributed on either side of the recess, to balance the OCU when strapped to an arm or other object. Also visible in cross-section are a radio 1904, a USB connector 1906, a processor 1910, display 1604, a display support 1912, and a main board 1914, also discussed below.

Figure 26:
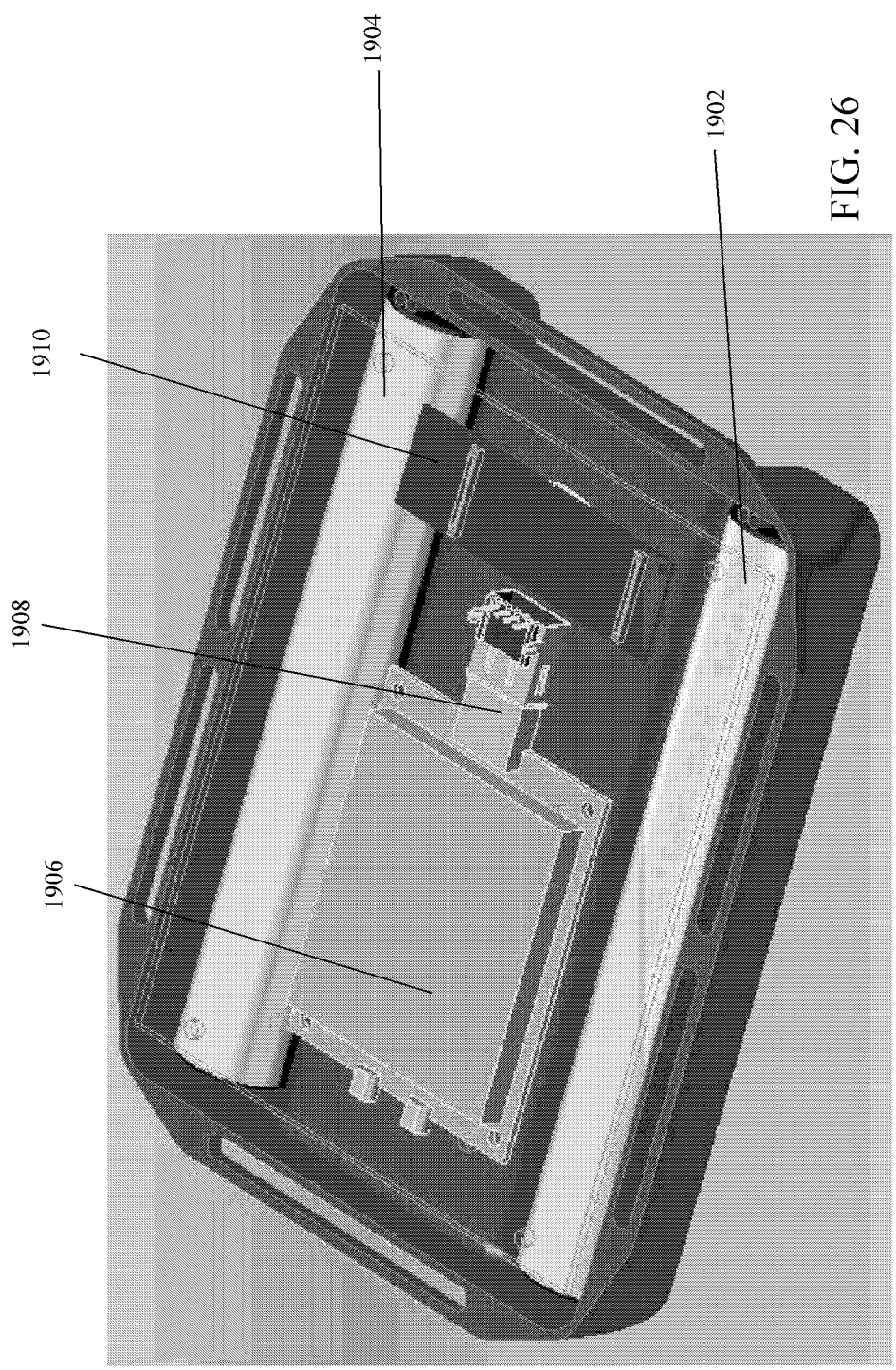
FIG. 26 is a top perspective view of the handheld controller of FIG. 20, with the cover and screen removed.

FIG. 26 is a top perspective view of an embodiment of the handheld controller shown in FIG. 20, with the cover and screen removed. The batteries 1902, 1904 can be seen disposed along sides of the OCU. Radio 1906 and USB connector 1908 can be provided in the OCU, in between the battery units 1902, 1904. Processor 1910 can also be provided to control operation of the OCU. In an exemplary embodiment, the processor 1910 can be a Gumstix module, though it will be appreciated that any appropriate processor can be used in the OCU.

Figure 27:
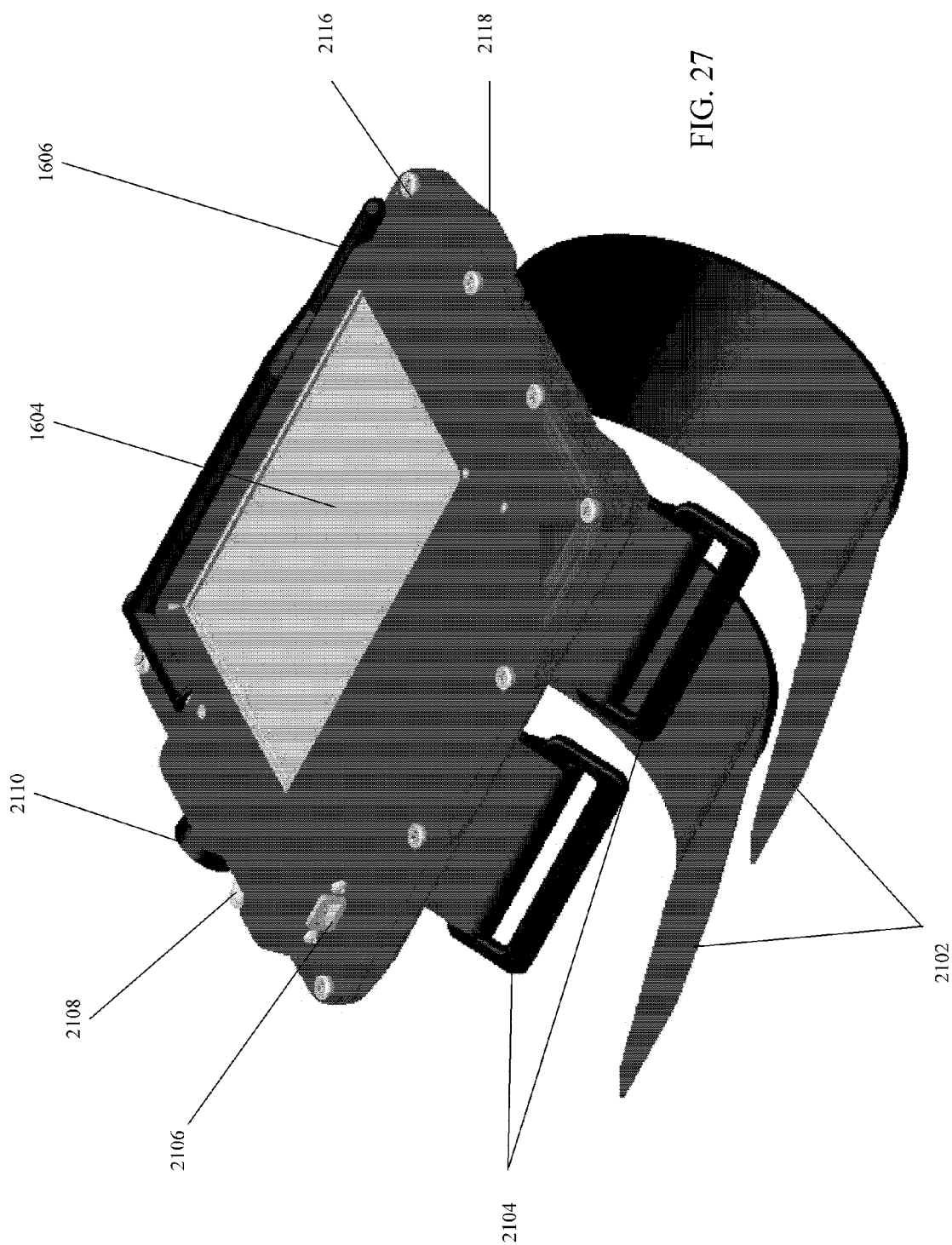
FIG. 27 is a side perspective view of another embodiment of a controller that can be attached to an operator's wrists using one or more straps.

FIG. 27 is a side perspective view of another exemplary embodiment of an OCU that can be attached to an operator's forearm or wrist using one or more attachment devices. In the illustrated embodiment, straps 2102 and accommodating buckles 2104 can be provided on the rear of the OCU housing permit attachment to an operator. The illustrated OCU comprises a housing having a top portion 2116 and a bottom portion 2118, a display 1604 (such as an LCD screen, which can be, e.g., a WVGA 800×480 side LED backlit LCD screen), a power button 2110, a charge connector 2108, and a USB port 2106. Wrist straps 2102 and buckles 2104 can be attached to the bottom portion 2118 of the housing.

Figure 28:
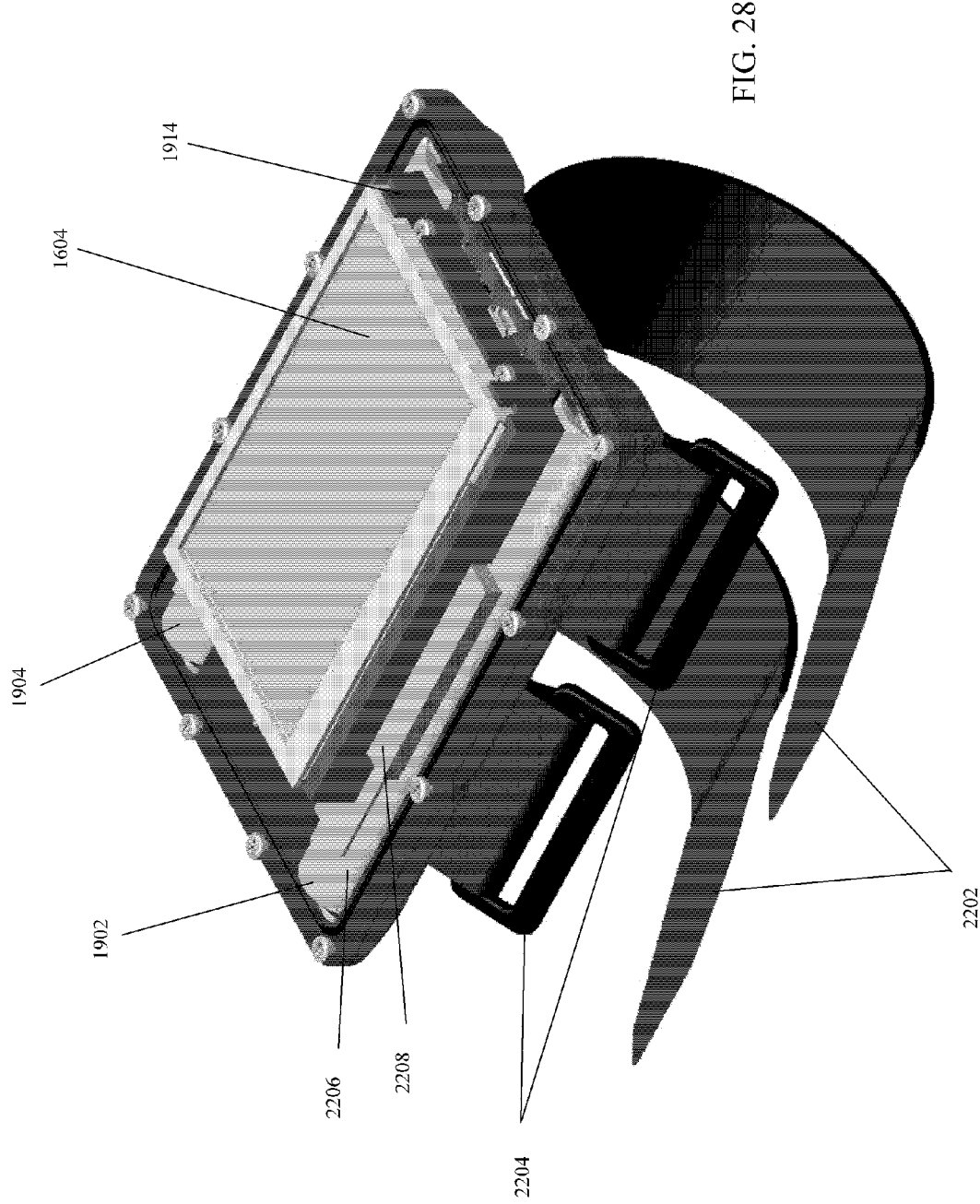
FIG. 28 is a side perspective view of the controller of FIG. 27, with the top cover removed.

FIG. 28 is a side perspective view of the controller of FIG. 27, with the top portion of the housing removed. Display screen 1604 can be seen disposed within the housing and supported by display support 1914 to support an outer portion of the display screen 1604. A battery protection board 2206 is illustrated covering each of the battery units 1902, 1904 to protect the battery units. The battery protection boards 2206 can include a protrusion 2208 which protrudes toward the top portion of the OCU, and which in embodiments can support an inner surface of the top portion of the OCU.

Figure 29:
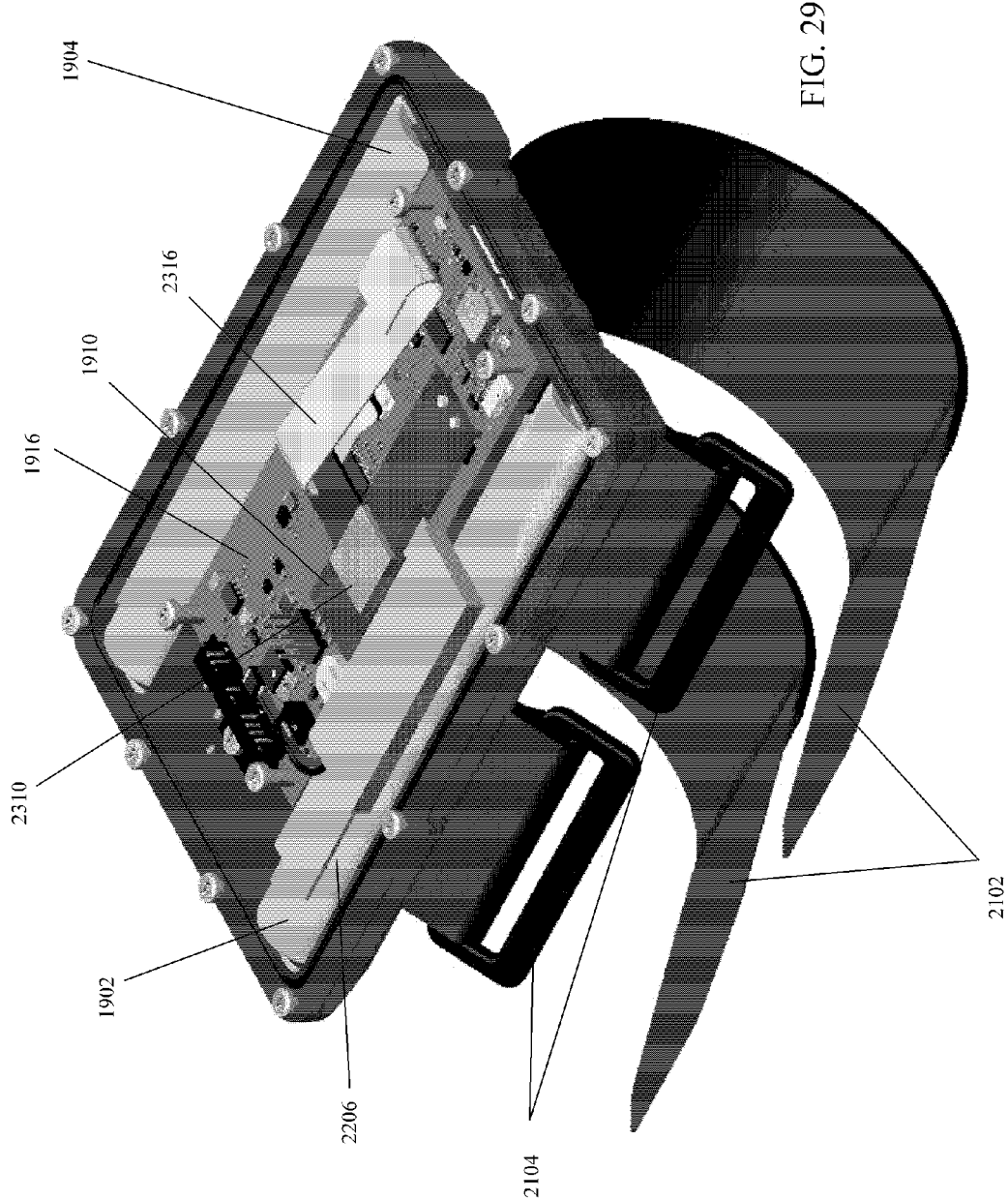
FIG. 29 is a side perspective view of the controller of FIG. 27, with the top cover and display screen removed.

FIG. 29 is a side perspective view of the OCU of FIG. 27, with the top portion of the housing and the display screen removed. Batteries 1902, 1904 can be provided along a side surface of each side of the OCU housing, with at least one of the batteries including a battery protection board 2306. Main board (PCB) 1916 is shown disposed along an inner surface of the lower half of the OCU housing, which supports processor 1910 (such as, for example, a Gumstix module) and an SD card slot 2310. A flexible connector or cable 2316 can be used to connect the main board to at least a display screen.

Figure 30:
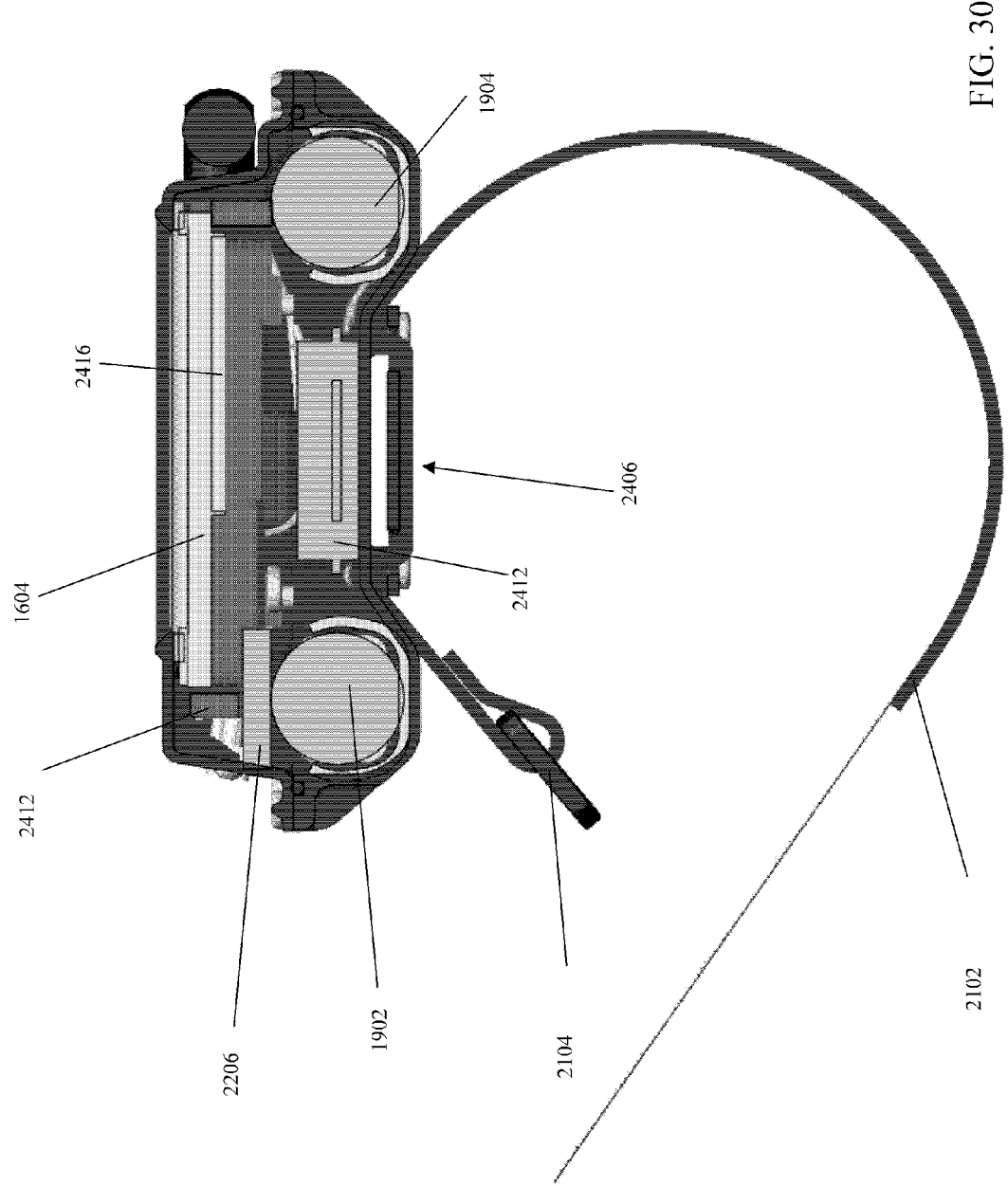
FIG. 30 is a cross sectional view of the controller of FIG. 27.

FIG. 30 is a cross sectional view of the controller of FIG. 27. Strap 2102 and buckle 2104 are attached to the lower half of the OCU housing by a fastener 2406. A battery 2102, 2104 can be seen on each side of the housing, with at least one of the batteries including a battery protection board 2206. A radio or radio module 1906 is in a bottom portion of the OCU housing between the batteries 1902, 1904. An SD card slot 2412, display device 1604, and display board (PCB) 2416 can be provided in an upper portion of the OCU housing.

Figure 31:
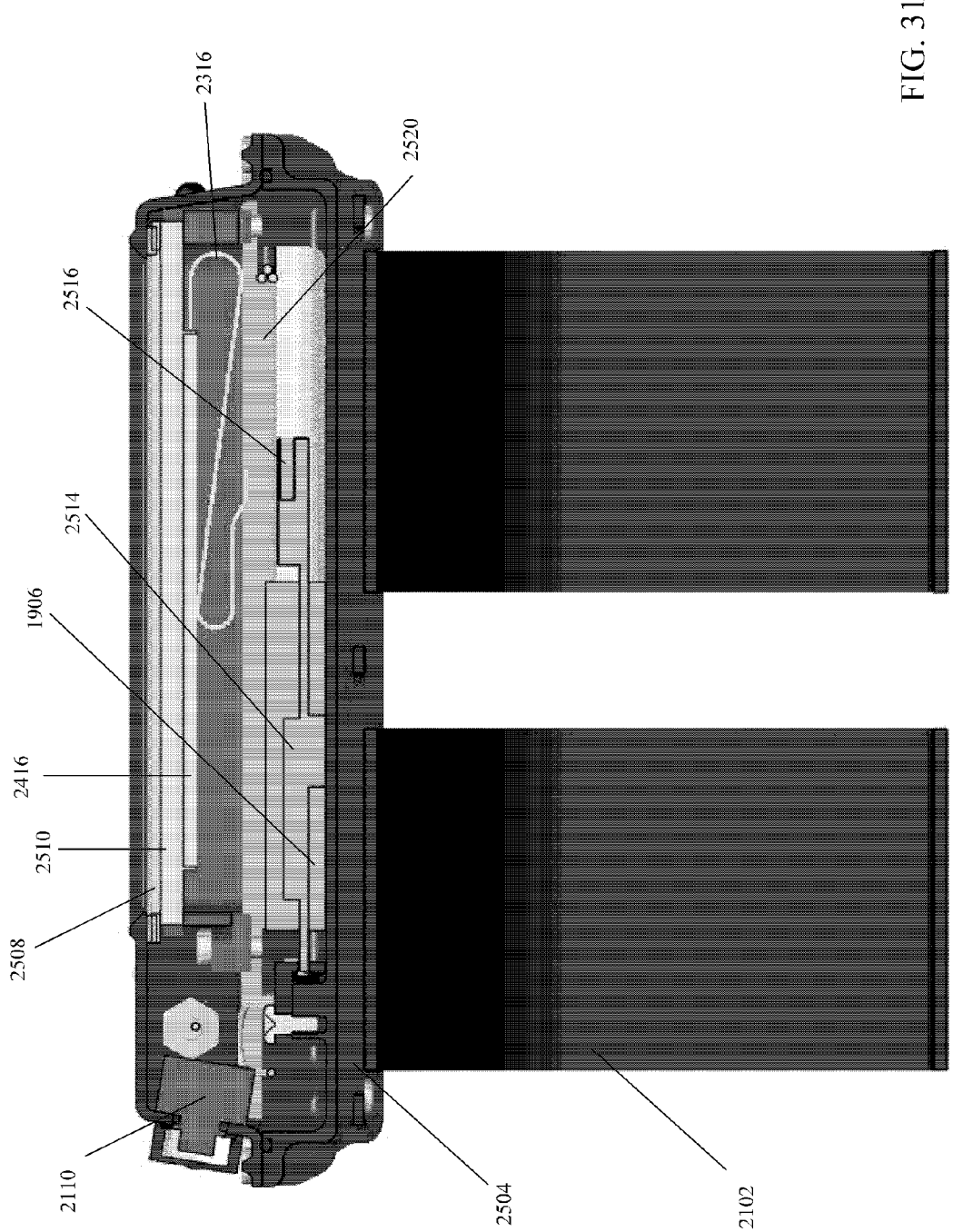
FIG. 31 is another cross sectional view of the controller of FIG. 27.

FIG. 31 is another cross sectional view of the controller of FIG. 27. Straps 2102 are attached to a lower portion of the OCU housing by strap connectors 2504 (for example, fastener 2406). A touch panel 2508 can be provided above display 1604 to enable the OCU to receive inputs. Display board (PCB) 2416 is disposed below display 1604 to control operations of the display 1604. A flexible connector 2316 can be used to connect the display board 2416 to the main board 1916. Radio or radio module 1906 can be disposed in a bottom portion of the housing, along with a USB connection 2514 to permit a data/power connection with the radio/module 1906 through USB connector 2516. Power button 2110 is disposed along a surface of the housing to permit the control of operational states of the OCU.

Figure 32:
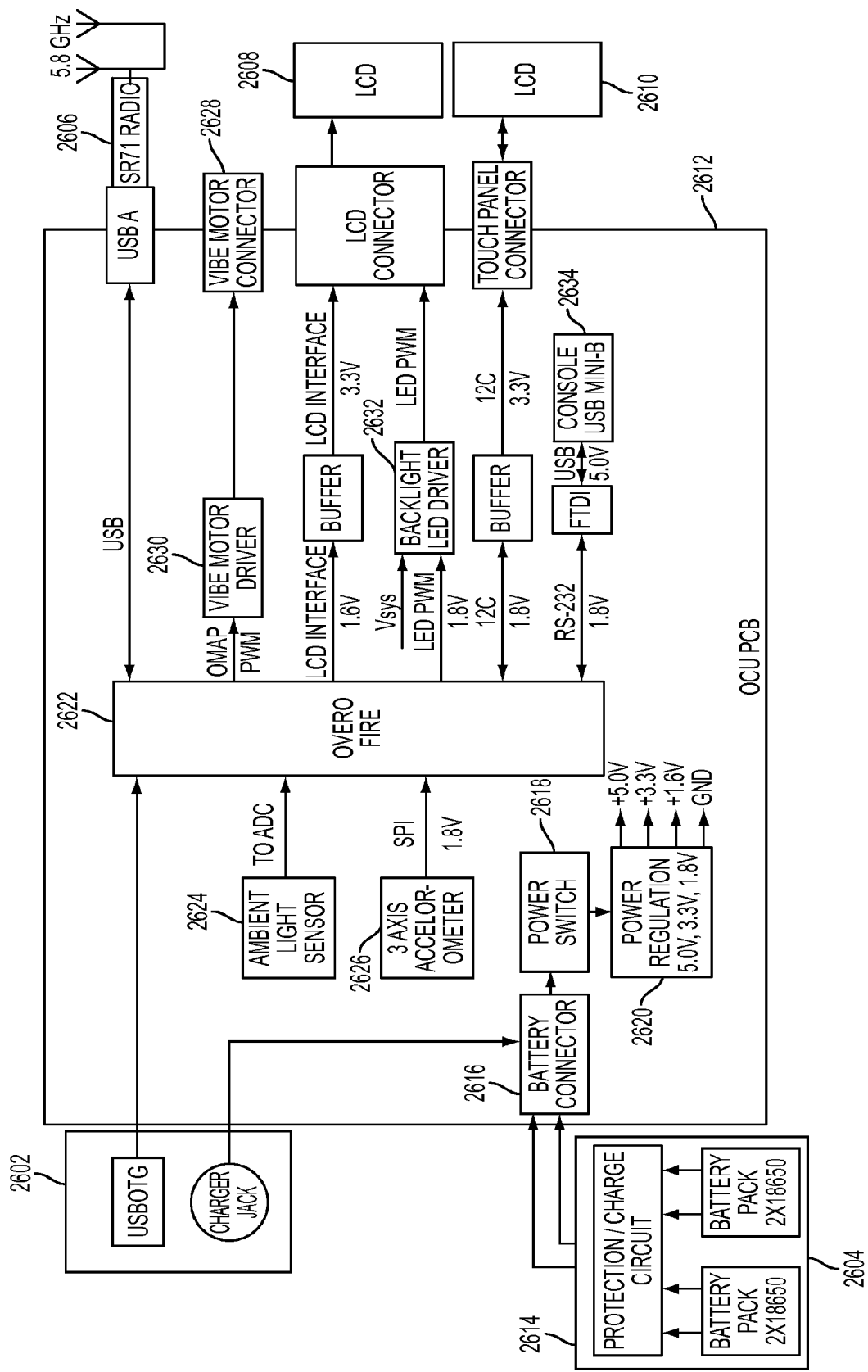
FIG. 32 is an embodiment of an operator control unit (OCU) system diagram.

FIG. 32 illustrates an embodiment of an OCU system diagram, illustrating connections of a charger 2602, batteries 2604, radio 2606 (which can be, for example, a SR71 Radio), a display board (PCB) 2608, and a touch panel 2610 to the main PCB 2612. Battery protection board 2614 communicates with battery connector 2616, which can receive power from a charger jack of charger 2602. Power from the batteries can pass through a power switch 2618 to a power regulation system 2620 for the main PCB 2612. Processor 2622 (which can be, in embodiments, a Gumstix Overo Fire processor, or other appropriate processor) can receive input from, for example, an ambient light sensor 2624 and a three-axis accelerometer 2626. A vibration motor can optionally be provided comprising a driver 2630 and a connector 2628. A backlight LED driver 2632 can also be provided drive a backlight for display 2608. Touch panel 2610 can receive input and communicate the input to a processor via an appropriate connector through a connection, which can optionally include a data buffer to provide smooth transfer of data.

FIG. 33 is a system diagram for an exemplary embodiment of a robot docking station 2702 including a charger. The docking station 2702 can comprise power input 2704 to receive power from an external electrical source which provides received power to smart charger unit 2706. Smart charger unit 2706 is in communication with charger PCB 2708, which controls charging operation of the docking station 2702. The charger PCB is also in communication with charge pins 2710, through which charging power is provided to a robot when the robot is coupled with docking station 2702 to charge battery units of the robot.

Figure 34:
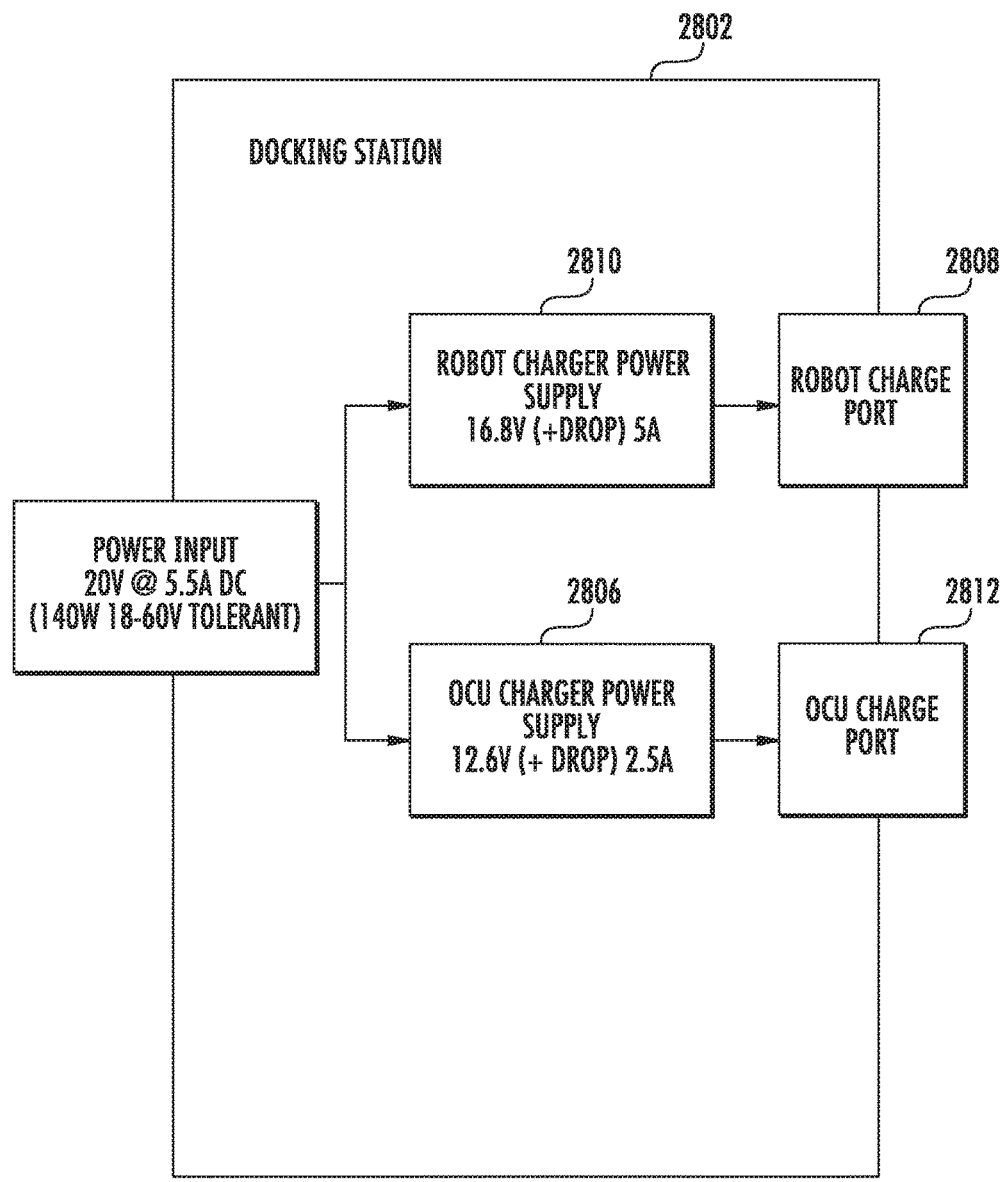
FIG. 34 is a system diagram for another embodiment of a robot docking station and charger.

FIG. 34 is a system diagram for another exemplary embodiment of a robot docking station and charger. Docking station 2802 can comprise power input 2804 to receive power from an external electrical source which provides received power to power supplies 2806 and 2810, to provide power to the robot charge port 2808 and the OCU charge port 2812, respectively. Docking station 2802 can thus accommodate both a robot system at charge port 2802 and an OCU for the robot system at charge port 2812, to permit convenient charging of the robot and the OCU at the docking station 2802.

In certain embodiments of the present teachings, the same type of processor can be used in both the robot and the OCU. The processor is preferably a low power/high performance processor intended for battery power, and having a digital signal processor to perform mathematical computation. In certain embodiments, tasks can be broken up by processor and calculations can be simultaneously made on both the robot and the OCU.

Motor Dithering

Certain embodiments of a robot in accordance with the present teachings can use a Freescale Semiconductor MC33932VW H-Bridge to control one or more drive motors. Because the maximum PWM frequency for this H-bridge (11 KHz) is in the audible range, reducing the audible component of the driving PWM signal can be desirable. Reducing the audible component can be accomplished by randomly varying the PWM frequency slightly, so that no single frequency carries all of the audible energy generated by the motors.

The robot main control loop runs 128 times per second. Each time through the control loop, a PWM dithering function can be called to adjust the frequency of the PWM signal. The frequency can, for example, be set as a center frequency, plus or minus a small random percentage. Because this is done frequently, efficient integer math is used in all calculations.

The center frequency can be chosen, for example, to be 10.4166 KHz, because this is a convenient divisor of the embodiment's selected CPU's 8 MHz PWM timer clock just below the 11 KHz H-Bridge maximum. This is 768 ticks of the 8 MHz PWM timer. A Galois Linear Feedback Shift Register can be used to generate pseudorandom numbers to adjust the period to the range 752 to 783, which is about plus or minus 2% of 768. For a given duty cycle, a new PWM comparison value can be chosen based on this new PWM period.

There can be an additional constraint imposed by the H-Bridge that the minimum on or off pulse times should be greater than 10 uS to allow the FETs to switch fully on or off. At 10.4166 KHz, this corresponds to duty cycles below 10% and above 90%. For these cases, instead of dithering the PWM period, the PWM comparison value is dithered. A random value between 80 and 120 is chosen (10 uS to 15 uS) for the on or off time, and the PWM period is calculated based on the desired duty cycle.

This process can provide a reduced acoustic signature for stealth operation and can allow use of a more efficient H-bridge to provide longer run times. A more efficient H-bridge can also provide improved thermal characteristics which lead to less heat sinking and therefore a lighter robot, and the ability to operate in higher ambient temperatures. In addition, dithering PWM frequency and pulse width reduces radiated emissions.

The remote vehicle embodiments described herein can also include additional components that were omitted from the drawings for clarity of illustration and/or operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts may be reversed, and certain features of the present teachings may be utilized independently, all as would be apparent to one skilled in the art after having the benefit of the description herein. Changes may be made in the elements described herein without departing from the spirit and scope of the present teachings and following claims, including their equivalents.

It is to be understood that the particular examples and embodiments set forth herein are non-limiting, and modifications to structure, dimensions, materials, and methodologies may be made without departing from the scope of the present teachings.

For the purposes of this specification and appended claims, unless otherwise indicated, all numbers expressing quantities, percentages or proportions, and other numerical values used in the specification and claims, are to be understood as being modified in all instances by the term "about" if they are not already. Accordingly, unless indicated to the contrary, the numerical parameters set forth in the following specification and attached claims are approximations that may vary depending upon the desired properties sought to be obtained by the present teachings. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It should be understood that while the present teachings have been described in detail with respect to various exemplary embodiments thereof, it should not be considered limited to such, as numerous modifications are possible without departing from the broad scope of the appended claims, including the equivalents they encompass.

What is claimed is:

1. A mobile robot system comprising:
   a mobile robot including:
   a housing;
   driven tracks disposed on the housing;
   right and left flippers disposed on corresponding right and left sides of the housing, each of the flippers rotatable with respect to the housing, the flippers and the tracks arranged to allow the robot to climb stairs; and
   an antenna disposed on a top surface of the housing and extending upward away from the top surface, the top surface of the housing being lower than a height of the tracks with respect to a supporting ground surface of the robot, forming a gap volume between the top surface of the housing and the tracks, the antenna having a vertical height with respect to the supporting ground surface greater than a vertical height of an envelope of rotation of the flippers and being sized to fit within the gap volume between the top surface of the housing and the tracks, the antenna being flexible along at least a majority of a length of the antenna, the antenna being movable between a stowed state and a deployed state, the antenna folded and positioned in the gap volume during the stowed state, the antenna erect and extending out of the gap volume during the deployed state; and
   an operator control unit configured to remotely control the mobile robot, the operator control unit including a strap and a buckle attached to a back surface of the operator control unit and configured to receive the strap, the strap and the buckle operable to secure the operator control unit to an operator so that the back surface accommodates an operator's forearm, the operator control unit including a front surface opposite the back surface, the front surface including a display and a stowable control unit antenna, the stowable control unit antenna being movable between a stowed position and a deployed position;
   wherein a combined weight of the flippers and the antenna is sufficient to move a center-of-gravity of the robot far enough to tilt the housing with respect to the supporting ground surface; and
   wherein a total weight of the robot is less than about five pounds.

2. The mobile robot system of claim 1, wherein the antenna is located on a forward end of the housing and the flippers are located on a rear end of the housing, the antenna assisting in stair climbing by moving the center-of-gravity of the robot forward, helping a front end of the robot tip forward as the robot surmounts a stair riser.

3. The mobile robot system of claim 1, wherein the combined weight of the antenna and the two flippers of the mobile robot is less than about 10 percent of the total weight of the mobile robot.

4. The mobile robot system of claim 1, wherein the combined weight of the antenna and the two flippers of the mobile robot is less than about 5 percent of the total weight of the mobile robot.

5. The mobile robot system of claim 1, wherein the mobile robot dimensions are less than about 10 inches long and about 9 inches wide and about 4 inches high exclusive of the antenna.

6. The mobile robot system of claim 1, wherein the antenna is confined entirely within the gap volume and entirely within a boundary of the top surface of the housing during the stowed state.

7. The mobile robot system of claim 1, wherein the flippers and the tracks are arranged to allow the robot to climb stairs having a riser height of between about 7.5 inches and about 8 inches.

8. The mobile robot system of claim 1, wherein the operator control unit includes a length equal to about 6.5 inches, a width equal to about 4.5 inches, and a depth equal to about 2 inches.

9. The mobile robot system of claim 1, wherein the back surface of the operator control unit includes a recessed surface configured to receive the forearm of the operator.

10. A mobile robot system comprising:
a mobile robot including:
a housing having a top surface;
driven tracks disposed on the housing, the top surface of the housing lower than a height of the tracks with respect to a supporting ground surface of the robot, forming a gap volume between the top surface of the housing and the tracks;
right and left flippers disposed on corresponding right and left sides of the housing, each of the flippers rotatable with respect to the housing, the flippers and the tracks arranged to allow the robot to climb stairs; and
an antenna disposed on the top surface of the housing and extending upward away from the top surface, the antenna having a vertical height with respect to the supporting ground surface of the robot greater than a vertical height of an envelope of rotation of the flippers and being sized to fit within the gap volume, the antenna being flexible along at least a majority of a length of the antenna, the antenna movable between a stowed state and a deployed state, the antenna folded and positioned in the gap volume during the stowed state, the antenna erect and extending out of the gap volume during the deployed state; and
an operator control unit configured to remotely control the mobile robot, the operator control unit including a strap and a buckle attached to a back surface of the operator control unit and configured to receive the strap, the strap and the buckle operable to secure the operator control unit to an operator so that the back surface accommodates the operator's forearm, the operator control unit including a front surface opposite the back surface, the front surface including a display and a stowable control unit antenna, the stowable control unit antenna being movable between a stowed position and a deployed position;
wherein a combined weight of the flippers and the antenna is sufficient to move a center-of-gravity of the robot far enough to tilt the housing with respect to the surface ground supporting.

11. The mobile robot system of claim 10, wherein the antenna is located on a forward end of the housing and the flippers are located on a rear end of the housing, the antenna assisting in stair climbing by moving the center-of-gravity of the robot forward, helping a front end of the robot tip forward as the robot surmounts a stair riser.

12. The mobile robot system of claim 10, wherein the combined weight of the antenna and the two flippers of the mobile robot is less than about 10 percent of a total weight of the mobile robot.

13. The mobile robot system of claim 10, wherein the combined weight of the antenna and the two flippers of the mobile robot is less than about 5 percent of a total weight of the mobile robot.

14. The mobile robot system of claim 10, wherein the mobile robot dimensions are less than about 10 inches long and about 9 inches wide and about 4 inches high exclusive of the antenna.

15. The mobile robot system of claim 10, wherein the antenna is confined entirely within the gap volume and entirely within a boundary of the top surface of the housing during the stowed state.

16. The mobile robot system of claim 10, wherein the operator control unit includes a length equal to about 6.5 inches, a width equal to about 4.5 inches, and a depth equal to about 2 inches.

17. The mobile robot system of claim 10, wherein the back surface of the operator control unit includes a recessed surface configured to receive the forearm of the operator.

18. A mobile robot system comprising:
a mobile robot including:
a housing;
driven tracks disposed on the housing;
right and left flippers disposed on corresponding right and left sides of the housing, each of the flippers rotatable with respect to the housing, the flippers and the tracks arranged to allow the robot to climb stairs; and
an antenna disposed on a top surface of the housing and extending upward away from the top surface, the antenna having a vertical height with respect to a supporting ground surface of the robot greater than a vertical height of an envelope of rotation of the flippers and being sized to fit within a gap volume between the top surface of the housing and the tracks, the antenna being flexible along at least a majority of a length of the antenna, the antenna being movable between a stowed state and a deployed state, the antenna folded and positioned in the gap volume during the stowed state, the antenna erect and extending out of the gap volume during the deployed state; and
an operator control unit configured to remotely control the mobile robot, the operator control unit including a strap and a buckle attached to a back surface of the operator control unit and configured to receive the strap, the strap and the buckle operable to secure the operator control unit to an operator so that the back surface accommodates the operator's forearm, the operator control unit including a front surface opposite the back surface, the front surface including a display and a stowable control unit antenna, the stowable control unit antenna being movable between a stowed position and a deployed position.

19. The mobile robot system of claim 18, wherein the antenna is located on a forward end of the housing and the flippers are located on a rear end of the housing, the antenna assisting in stair climbing by moving the center-of-gravity of the robot forward, helping a front end of the robot tip forward as the robot surmounts a stair riser.

20. The mobile robot system of claim 18, wherein the combined weight of the antenna and the two flippers of the mobile robot is less than about 10 percent of a total weight of the mobile robot.

21. The mobile robot system of claim 18, wherein the combined weight of the antenna and the two flippers of the mobile robot is less than about 5 percent of a total weight of the mobile robot.

22. The mobile robot system of claim 18, wherein the mobile robot dimensions are less than about 10 inches long and about 9 inches wide and about 4 inches high exclusive of the antenna.

23. The mobile robot system of claim 18, wherein the operator control unit includes a length equal to about 6.5 inches, a width equal to about 4.5 inches, and a depth equal to about 2 inches.

24. The mobile robot system of claim 18, wherein the back side of the operator control unit includes a recessed surface configured to receive the forearm of the operator.

* * * * *